United States Patent
Barber et al.

(10) Patent No.: US 11,359,931 B2
(45) Date of Patent: Jun. 14, 2022

(54) VISION GUIDANCE SYSTEMS AND METHODS FOR AIRCRAFT

(71) Applicant: BOMBARDIER INC., Dorval (CA)

(72) Inventors: Anthony J. Barber, Dollard-des-Ormeaux (CA); Nami Bae, Montreal (CA); Marc Bergeron, Lasalle (CA); William Murray Colquhoun, Wichita, KS (US); Christopher Martin, Bradford (CA); Mark Schlegel, Kingman, KS (US); Natalie W. Wong, Lasalle (CA); Olivier Lebegue, Outremont (CA)

(73) Assignee: BOMBARDIER INC., Dorval (CA)

( * ) Notice: Subject to any disclaimer, the term of this patent is extended or adjusted under 35 U.S.C. 154(b) by 105 days.

(21) Appl. No.: 16/597,938

(22) Filed: Oct. 10, 2019

(65) Prior Publication Data
US 2020/0116521 A1 Apr. 16, 2020

Related U.S. Application Data

(60) Provisional application No. 62/744,411, filed on Oct. 11, 2018.

(51) Int. Cl.
| | |
|---|---|
| *G01C 23/00* | (2006.01) |
| *B64D 43/00* | (2006.01) |
| *G06T 19/00* | (2011.01) |
| *B64D 47/08* | (2006.01) |

(52) U.S. Cl.
CPC ........... *G01C 23/005* (2013.01); *B64D 43/00* (2013.01); *G06T 19/006* (2013.01); *B64D 47/08* (2013.01)

(58) Field of Classification Search
None
See application file for complete search history.

(56) References Cited

U.S. PATENT DOCUMENTS

| | | |
|---|---|---|
| 7,486,291 B2 | 2/2009 | Berson et al. |
| 8,462,019 B1 | 6/2013 | VanDerKamp et al. |
| 2005/0099433 A1* | 5/2005 | Berson ............... G01D 7/08 345/619 |

(Continued)

FOREIGN PATENT DOCUMENTS

EP 2426461 A2 3/2012

OTHER PUBLICATIONS

Theunissen et al., "Guidance, Situation Awareness and Integrity Monitoring with an SVS+EVS", AIAA, Guidance, Navigation, and Control Conference and Exhibit, Aug. 15-18, 2005, pp. 1-14, San Francisco, California.

Airbus, "Getting to Grips with Category II and III Operations", Flight Operations Support & Line Assistance, Oct. 2001, pp. 1-182, Issue 3, France.

(Continued)

*Primary Examiner* — Jeffrey J Chow
(74) *Attorney, Agent, or Firm* — Norton Rose Fulbright Canada LLP

(57) ABSTRACT

Systems and methods useful in providing equivalent visual operation (EVO) for the flight crew of an aircraft independent of the actual outside weather and visibility conditions through the use of synthetic vision (SV) and enhanced vision (EV) technologies are described. The systems and methods described herein can contribute toward gaining an operational credit that can expand the operational capabilities of an aircraft. The systems and methods described herein can provide relatively simple and intuitive solutions for activating and operating such systems.

30 Claims, 23 Drawing Sheets

(56) References Cited

U.S. PATENT DOCUMENTS

| | | | | |
|---|---|---|---|---|
| 2007/0008188 A1* | 1/2007 | Firra | ............. | G01D 7/02 |
| | | | | 340/973 |
| 2008/0262664 A1* | 10/2008 | Schnell | ............. | G01C 23/00 |
| | | | | 701/4 |
| 2013/0155093 A1 | 6/2013 | He | | |
| 2015/0019048 A1* | 1/2015 | Krishna | ............. | G01C 23/005 |
| | | | | 701/4 |
| 2016/0332745 A1* | 11/2016 | Kneuper | ............. | G08G 5/0021 |
| 2016/0377862 A1 | 12/2016 | Zimmerman et al. | | |
| 2017/0186238 A1 | 6/2017 | Ganille et al. | | |
| 2018/0232097 A1* | 8/2018 | Kneuper | ............. | G08G 5/0034 |
| 2020/0355518 A1* | 11/2020 | Bilek | ............. | B64D 43/00 |

OTHER PUBLICATIONS

Matt Thurber, "This HUD's For You", Business Aviation News: Aviation International News, Dec. 26, 2018, pp. 1-3, https://www.ainonline.com/aviation-news/business-aviation/2018-12-26/huds-you, accessed on Jul. 16, 2019.

John Croft, "Uncertainty Dogs Next-Generation Synthetic Vision Systems", ShowNews, May 1, 2015, pp. 1-7, http://aviationweek.com/ebace-2015/uncertainty-dogs-next-generation-synthetic-vision-s . . . , accessed on Oct. 8, 2018.

Bailey et al., "Fusion of Synthetic and Enhanced Vision for All-Weather Commercial Aviation Operations", NATO HFM-141 Symposium on Human Factors of Day/Night All-Weather Operations; Apr. 23, 2007-Apr. 25, 2007, pp. 11-1 to 11-26, Heraklion, Greece.

European Patent Office, Communication dated Mar. 2, 2020 re: European Patent Application No. 19202521.1.

* cited by examiner

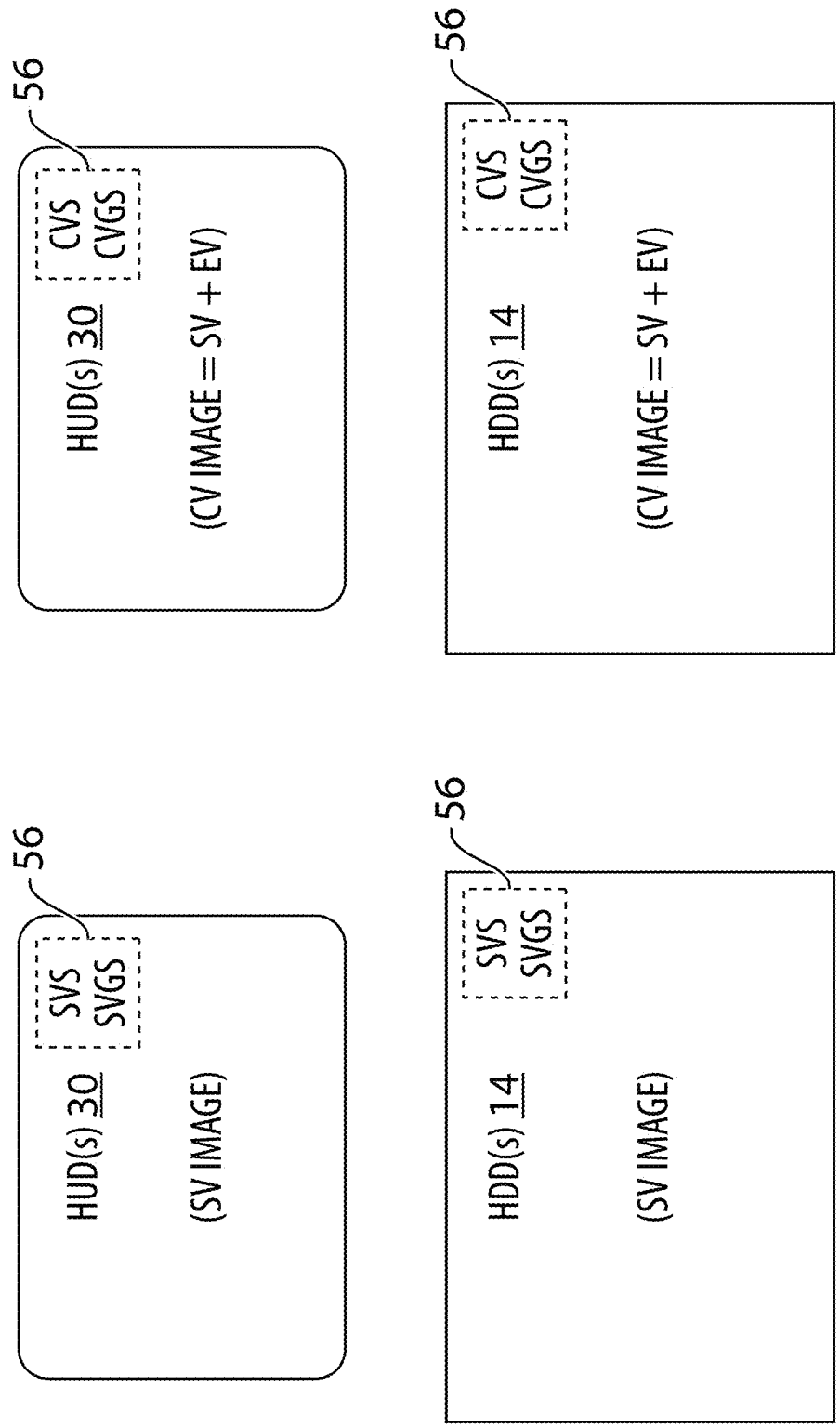

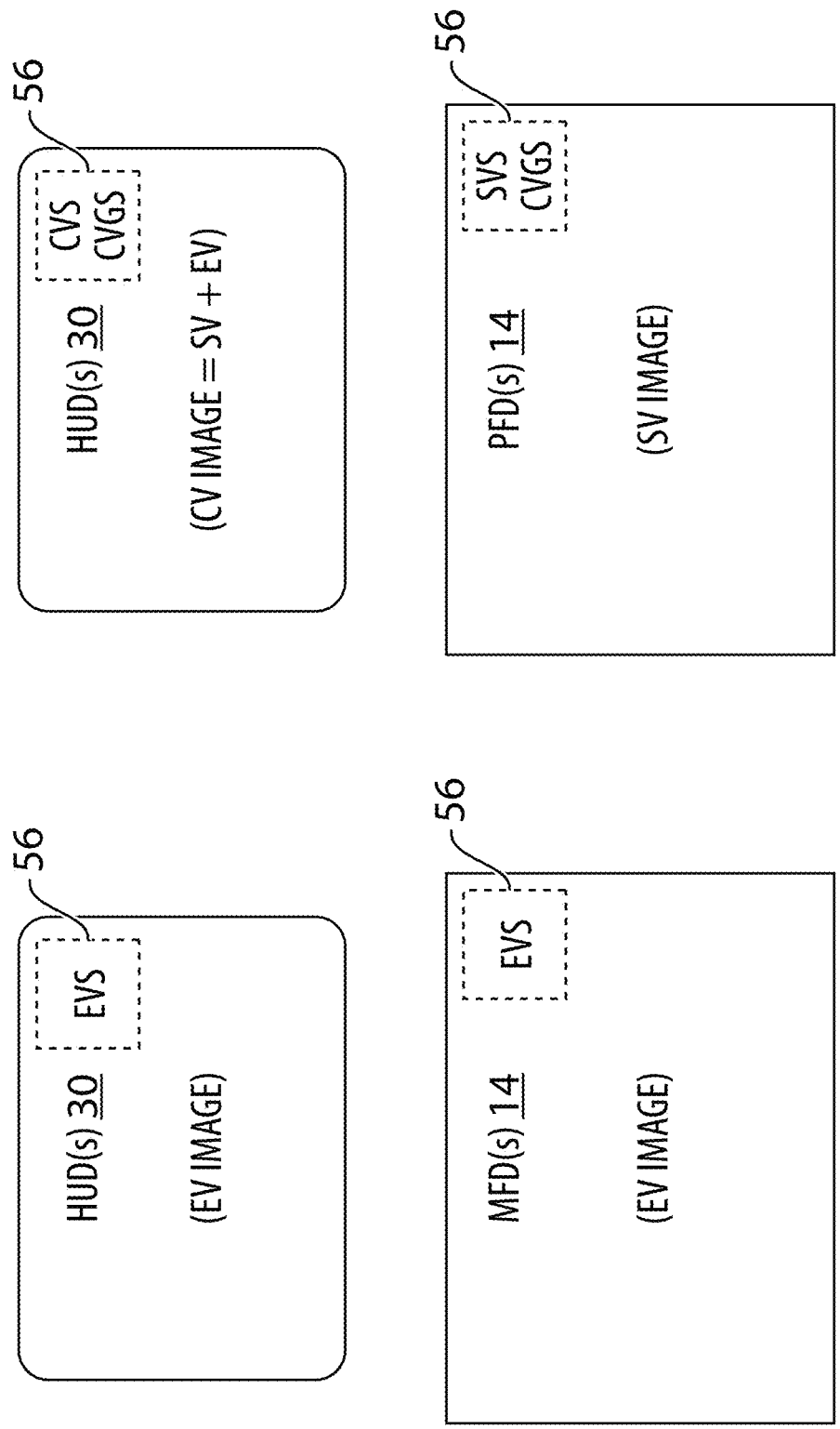

| CONDITIONS | | | | | | | ARM STATUS | FLIGHT DECK ANNUNCIATIONS | NOTES |
| --- | --- | --- | --- | --- | --- | --- | --- | --- | --- |
| A | B | C | D | E | F | | | | |
| N | X | X | X | X | X | | DISABLED | <BLANK> | |
| Y | N | N | N | N | X | | CAUTION | 1) "SVGS" or "CVGS" in amber on PFD<br>2) "NO SVGS" or "NO CVGS" on HUD<br>3) "SVGS INVALID (C)" or "CVGS INVALID (C)" on CAS | ARMED PHASE - NO SBAS |
| Y | N | N | N | Y | X | | ARMED | 1) "SVGS" or "CVGS" in white or cyan on PFD<br>2) "SVGS ARM" or "CVGS ARM" on HUD | ARMED PHASE - NORMAL |
| Y | N | N | Y | N | X | | CAUTION | 1) "SVGS" or "CVGS" in amber on PFD<br>2) "NO SVGS" or "NO CVGS" on HUD<br>3) "SVGS INVALID (C)" or "CVGS INVALID (C)" on CAS | ARMED PHASE - DB FAIL / OUTDATED |
| Y | N | Y | X | X | X | | CAUTION | 1) "SVGS" or CVGS" in amber on PFD<br>2) "NO SVGS" or "NO CVGS" on HUD<br>3) "SVGS INVALID (C)" or "CVGS INVALID (C)" on CAS | ARMED PHASE - SVS or CVS FAIL |
| Y | Y | N | N | Y | Y | | ACTIVE | 1) "SVGS" or "CVGS" in GREEN on PFD<br>2) "SVGS" or "CVGS" on HUD | ACTIVE PHASE - NORMAL |

FIG. 14A

| CONDITIONS | DESCRIPTIONS |
|---|---|
| A | (SVGS or CVGS approach selected ON) AND (Radio altitude minimum set and valid) AND (SV or CV displayed) AND (Aircraft within 31NM of destination) |
| B | (Active lateral mode APPR LOC) AND (Radio altitude valid) |
| C | Failure of SVS or CVS reported |
| D | (SVS obstacle failure OR SVS airport/runway failure reported) OR (SVS database expired) |
| E | GNSS in SBAS mode |
| F | System monitor(s) NOT failed |

FIG. 14B

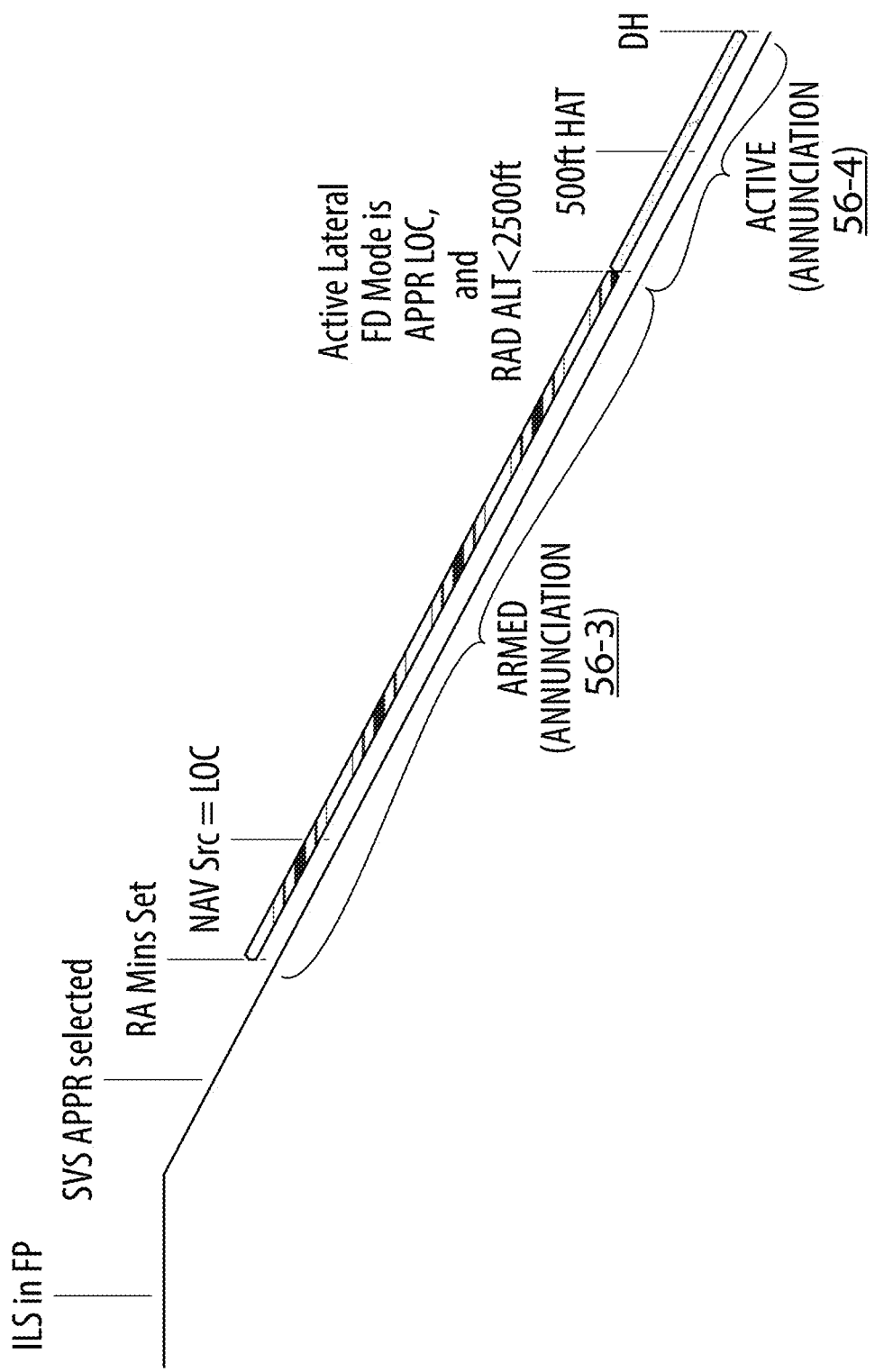

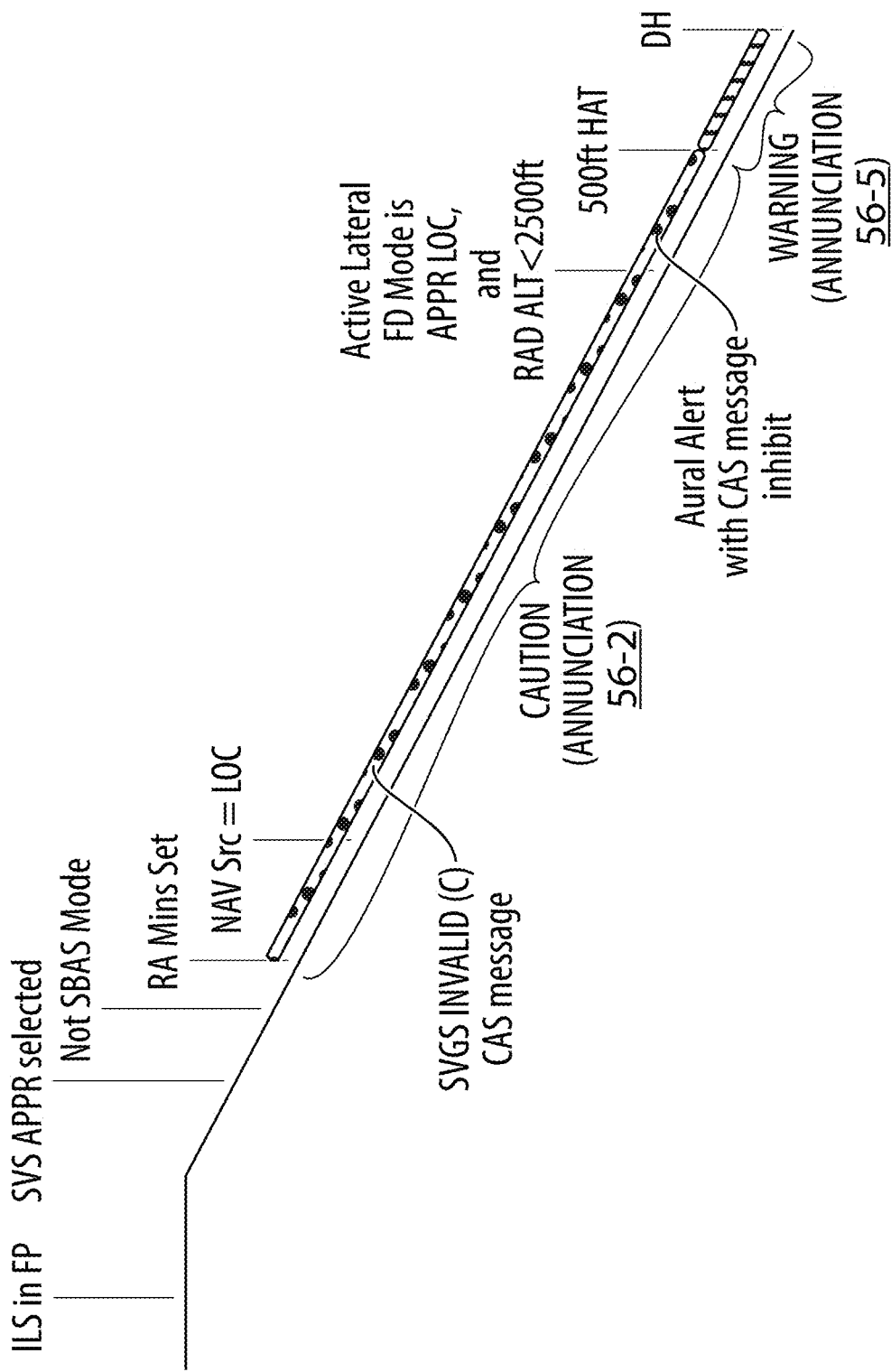

```
                  200
                     ↘
    ┌─────────────────────────────────────────────────────────────┐
    │  RECEIVING A FIRST USER INPUT INDICATIVE OF A DESIRED        │
    │       ACTIVATION OF THE CVGS OPERATING MODE                  │
    │                          202                                 │
    └─────────────────────────────────────────────────────────────┘
                              │
                              ▼
    ┌─────────────────────────────────────────────────────────────┐
    │ ACTIVATING THE CVGS OPERATING MODE IN AN ABSENCE OF A        │
    │ SECOND USER INPUT INDICATIVE OF A DESIRED DISPLAY MODE OF    │
    │ ONE OR MORE DISPLAY DEVICES OF THE AIRCRAFT                  │
    │                          204                                 │
    └─────────────────────────────────────────────────────────────┘
```

FIG. 17

```
                  300
                     ↘
    ┌─────────────────────────────────────────────────────────────┐
    │ OPERATING THE VISION GUIDANCE SYSTEM OF THE AIRCRAFT IN A    │
    │ CVGS OPERATING MODE INCLUDING A COMBINATION OF SV AND EV     │
    │                          302                                 │
    └─────────────────────────────────────────────────────────────┘
                              │
                              ▼
    ┌─────────────────────────────────────────────────────────────┐
    │            DETERMINING THAT THE EV IS UNAVAILABLE            │
    │                          304                                 │
    └─────────────────────────────────────────────────────────────┘
                              │
                              ▼
    ┌─────────────────────────────────────────────────────────────┐
    │ AUTOMATICALLY DEACTIVATING THE CVGS OPERATING MODE AND       │
    │ ACTIVATING A SVGS OPERATING MODE INCLUDING THE USE OF SV WITHOUT EV │
    │                          306                                 │
    └─────────────────────────────────────────────────────────────┘
```

```
┌─────────────────────────────────────────────────────────┐
│ RECEIVING AN INPUT INDICATIVE OF A DESIRED ACTIVATION OF THE │
│           SVGS OR THE CVGS OPERATING MODE               │
│                         402                             │
└─────────────────────────────────────────────────────────┘
                            ↓
┌─────────────────────────────────────────────────────────┐
│           ARMING THE SVGS OR SVGS OPERATING MODE        │
│                         404                             │
└─────────────────────────────────────────────────────────┘
                            ↓
┌─────────────────────────────────────────────────────────┐
│ WHEN THE AIRCRAFT HAS REACHED A THRESHOLD CONDITION,    │
│      ACTIVATING THE SVGS OR CVGS OPERATING MODE         │
│                         406                             │
└─────────────────────────────────────────────────────────┘
```

```
┌─────────────────────────────────────────────────────────┐
│   RECEIVING AN INPUT VIA A MULTIFUNCTION CONTROLLER     │
│   DISPOSED IN A GLARE SHIELD PANEL OF THE AIRCRAFT      │
│                         502                             │
└─────────────────────────────────────────────────────────┘
                            ↓
┌─────────────────────────────────────────────────────────┐
│            ACTIVATING THE CVGS OPERATING MODE           │
│                         504                             │
└─────────────────────────────────────────────────────────┘
```

FIG. 20

VISION GUIDANCE SYSTEMS AND METHODS FOR AIRCRAFT

CROSS REFERENCE TO RELATED APPLICATION AND CLAIM OF PRIORITY

The present application claims priority to U.S. provisional patent application No. 62/744,411 filed on Oct. 11, 2018, the entire contents of which are incorporated herein by reference.

TECHNICAL FIELD

The disclosure relates generally to aircraft, and more particularly to equivalent visual operation for aircraft.

BACKGROUND

Synthetic vision (SV) and enhanced vision (EV) can provide significant improvements in situational awareness for aircraft pilots. A typical SV system uses a computer-generated image of the external scene topography generated from aircraft attitude, navigation data, and data of the terrain and obstacles (e.g., towers, buildings and other environment features) stored in a database. The SV system uses the database stored on board the aircraft, an image generator computer, and a display device located in the cockpit of the aircraft for displaying computer-generated images of the external scene topography.

An EV system, also called "enhanced flight vision system" (EFVS) provides a display of the external scene to the aircraft pilots by using a forward-facing imaging sensor mounted to an aircraft. An EV system provides the pilot with an image which can enhance unaided human vision. An EV system can include one or more imaging sensors such as a color camera, infrared camera or radar. The image can be provided to the pilot via a display inside the cockpit.

SV and EV are useful tools that can improve the pilots' situational awareness especially in poor visibility conditions due to weather or haze, and at night. However, SV and EV currently do not provide an operational advantage that expands the operational capabilities of the aircraft. Improvement is desirable.

SUMMARY

In one aspect, the disclosure describes a vision guidance system of an aircraft. The system comprises:
a synthetic vision system;
an enhanced vision system;
a display device defining a display area;
one or more data processors operatively coupled to the display device, to the synthetic vision system and to the enhanced vision system; and
non-transitory machine-readable memory operatively coupled to the one or more data processors and storing instructions executable by the one or more processors and configured to cause the one or more processors to:
cause simultaneous display of a first selectable object and of a second selectable object in the display area of the display device, the first selectable object being associated with the activation of a combined vision guidance operating mode of the vision guidance system and the second selectable object being associated with the activation of a synthetic vision guidance operating mode of the vision guidance system, the combined vision guidance operating mode including use of a combination of synthetic vision and enhanced vision, and the synthetic vision guidance operating mode including use of synthetic vision without enhanced vision; and
after a selection of the first selectable object associated with the combined vision guidance operating mode, cause an activation of the combined vision guidance operating mode.

The display device may be part of a multifunction controller disposed in a glare shield panel of the aircraft.

The instructions may be configured to cause the one or more processors to, after the selection of the first selectable object, cause arming the combined vision guidance operating mode before activating the combined vision guidance operating mode.

Causing the activation of the combined vision guidance operating mode may comprise automatically causing a head-up display device of a flight deck of the aircraft to display an image comprising the combination of synthetic vision and enhanced vision.

Causing the activation of the combined vision guidance operating mode may comprise automatically causing a head-down display device of a flight deck of the aircraft to display an image comprising the combination of synthetic vision and enhanced vision.

Causing the activation of the combined vision guidance operating mode may comprise automatically causing a head-down display device and a head-up display device of a flight deck of the aircraft to each display an image comprising the combination of synthetic vision and enhanced vision.

The instructions may be configured to cause the one or more processors to:
after the selection of the first selectable object, cause automatic arming of the combined vision guidance operating mode before causing activation of the combined vision guidance operating mode;
cause annunciation of the arming of the combined vision guidance operating mode on the head-up display device and on the head-down display device; and
upon causing the activation of the combined vision guidance operating mode, cause the annunciation of the activation of the combined vision guidance operating mode on the head-up display device and on the head-down display device.

Causing annunciation of the arming of the combined vision guidance operating mode may comprise causing an indication to be displayed in a first color on the head-up display device and on the head-down display device. Causing annunciation of the activation of the combined vision guidance operating mode may comprise causing the indication to be displayed in a second color different from the first color on the head-up display device and on the head-down display device.

The instructions may be configured to cause the one or more processors to cause activation of the combined vision guidance operating mode after a threshold condition has been met.

The threshold condition may comprise an altitude of the aircraft.

The threshold condition may comprise a distance of the aircraft from a runway.

The instructions may be configured to cause the one or more processors to cause monitoring of a deviation of a position of the aircraft from a desired flight path of the aircraft when the combined vision guidance operating mode is active.

The instructions may be configured to cause the one or more processors to cause automatic activation of one or more aircraft system monitors upon activation of the combined vision guidance operating mode.

The instructions may be configured to cause the one or more processors to:

while the combined vision guidance operating mode is active, determine that an enhanced vision system of the aircraft is unavailable; then cause automatic deactivation of the combined vision guidance operating mode; and cause automatic activation of the synthetic vision guidance operating mode.

The instructions may be configured to cause the one or more processors to cause annunciation of the activation of the synthetic guidance operating mode.

Embodiments can include combinations of the above features.

In another aspect, the disclosure describes a method for operating a combined vision guidance operating mode of a vision guidance system of an aircraft. The method comprises:

causing simultaneous display of a first selectable object and of a second selectable object in a display area of a display device, the first selectable object being associated with the activation of the combined vision guidance operating mode and the second selectable object being associated with an activation of a synthetic vision guidance operating mode of the vision guidance system, the combined vision guidance operating mode including use of a combination of synthetic vision and enhanced vision, and the synthetic vision guidance operating mode including the use of synthetic vision without enhanced vision;

receiving an input indicative of a selection of the first selectable object associated with the combined vision guidance operating mode, and after receiving the input, activating the combined vision guidance operating mode of the vision guidance system.

The display device may be part of a multifunction controller.

The input may be received in response to one or more actuations of a line select key.

The method may comprise, after receiving the input, arming the combined vision guidance operating mode before activating the combined vision guidance operating mode.

Activating the combined vision guidance operating mode may comprise automatically causing a head-up display device of a flight deck of the aircraft to display an image comprising the combination of synthetic vision and enhanced vision.

Activating the combined vision guidance operating mode may comprise automatically causing a head-down display device of a flight deck of the aircraft to display an image comprising the combination of synthetic vision and enhanced vision.

Activating the combined vision guidance operating mode may comprise automatically causing a head-down display device and a head-up display device of a flight deck of the aircraft to each display an image comprising the combination of synthetic vision and enhanced vision.

The method may comprise:

after receiving the input, automatically arming the combined vision guidance operating mode before activating the combined vision guidance operating mode;

annunciating the arming of the combined vision guidance operating mode on the head-up display device and on the head-down display device; and upon the activation of the combined vision guidance operating mode, annunciating the activation of the combined vision guidance operating mode on the head-up display device and on the head-down display device.

Annunciating the arming of the combined vision guidance operating mode may comprise displaying an indication in a first color on the head-up display device and on the head-down display device.

Annunciating the activation of the combined vision guidance operating mode may comprise displaying the indication in a second color different from the first color on the head-up display device and on the head-down display device.

The method may comprise activating the combined vision guidance operating mode after a threshold condition has been met.

The threshold condition may comprise an altitude of the aircraft.

The threshold condition may comprise a distance of the aircraft from a runway.

The method may comprise monitoring a deviation of a position of the aircraft from a desired flight path of the aircraft when the combined vision guidance operating mode is active.

The method may comprise automatically activating one or more aircraft system monitors upon activation of the combined vision guidance operating mode.

The method may comprise:

while the combined vision guidance operating mode is active, determining that an enhanced vision system of the aircraft is unavailable; then automatically deactivating the combined vision guidance operating mode; and automatically activating the synthetic vision guidance operating mode.

The method may comprise annunciating the activation of the synthetic guidance operating mode.

Embodiments can include combinations of the above features.

In a further aspect, the disclosure describes a vision guidance system of an aircraft. The system comprises:

a synthetic vision system;

an enhanced vision system;

one or more display devices;

one or more data processors operatively coupled to the one or more display devices, to the synthetic vision system and to the enhanced vision system; and non-transitory machine-readable memory operatively coupled to the one or more data processors and storing instructions executable by the one or more processors and configured to cause the one or more processors to:

after receiving a first user input indicative of a desired activation of the combined vision guidance operating mode combining synthetic vision and enhanced vision, cause an activation of the combined vision guidance operating mode of the aircraft in an absence of a second user input indicative of a desired display mode of the one or more display devices of the aircraft, wherein the activation of the combined vision guidance operating mode comprises causing automatic commanding of the desired display mode of the one or more display devices.

The system may comprise a multifunction controller via which the first user input is received. The multifunction controller may be disposed in a glare shield panel of the aircraft.

The one or more display devices may include a head-up display device.

The one or more display devices may include a primary flight display device.

The desired display mode may comprise displaying an image comprising synthetic vision.

The desired display mode may comprise displaying an image comprising a combination of synthetic vision and enhanced vision.

The desired display mode may comprise displaying an image comprising a combination of synthetic vision and enhanced vision. The one or more display devices may include both a head-up display device and a primary flight display device.

Embodiments can include combinations of the above features.

In a further aspect, the disclosure describes a method for operating a combined vision guidance operating mode of a vision guidance system of an aircraft. The method comprises:

receiving a first user input indicative of a desired activation of the combined vision guidance operating mode combining synthetic vision and enhanced vision; and after receiving the first user input, activating the combined vision guidance operating mode of the aircraft in an absence of a second user input indicative of a desired display mode of one or more display devices of the aircraft, wherein the activation of the combined vision guidance operating mode comprises automatically activating the desired display mode of the one or more display devices.

The method may comprise receiving the first user input via a multifunction controller disposed in a glare shield panel of the aircraft.

The one or more display devices may include a head-up display device.

The one or more display devices may include a primary flight display device.

The desired display mode may comprise displaying an image comprising synthetic vision.

The desired display mode may comprise displaying an image comprising a combination of synthetic vision and enhanced vision.

The desired display mode may comprise displaying an image comprising a combination of synthetic vision and enhanced vision. The one or more display devices may include both a head-up display device and a primary flight display device.

Embodiments can include combinations of the above features.

In a further aspect, the disclosure describes a vision guidance system of an aircraft. The system comprises:

a synthetic vision system;

an enhanced vision system;

one or more data processors operatively coupled to the synthetic vision system and to the enhanced vision system; and non-transitory machine-readable memory operatively coupled to the one or more data processors and storing instructions executable by the one or more processors and configured to cause the one or more processors to:

when the vision guidance system is operating in a combined vision guidance operating mode including a combination of synthetic vision and enhanced vision, determine that the enhanced vision is unavailable; and upon determining that the enhanced vision is unavailable, cause automatic deactivation of the combined vision operating mode and cause activation of a synthetic vision guidance operating mode including the use of synthetic vision without the enhanced vision.

The instructions may be configured to cause the one or more processors to, upon activation of the synthetic vision guidance operating mode, cause annunciation of the activation of the synthetic guidance operating mode on a head-up display device and on a head-down display device.

The activation of the synthetic vision guidance operating mode may comprise causing a head-up display device of a flight deck of the aircraft to display an image comprising synthetic vision without enhanced vision.

The activation of the synthetic vision guidance operating mode may comprise causing a head-down display device of the flight deck of the aircraft to display the image comprising synthetic vision without enhanced vision.

The activation of the synthetic vision guidance operating mode may comprise causing annunciation of the activation of the synthetic guidance operating mode on the head-up display device and on the head-down display device.

Embodiments can include combinations of the above features.

In a further aspect, the disclosure describes a method for operating a vision guidance system of an aircraft. The method comprises:

operating the vision guidance system of the aircraft in a combined vision guidance operating mode including a combination of synthetic vision and enhanced vision;

determining that the enhanced vision is unavailable; and upon determining that the enhanced vision is unavailable, automatically deactivating the combined vision guidance operating mode and activating a synthetic vision guidance operating mode including the use of synthetic vision without the enhanced vision.

The method may comprise, upon activating the synthetic vision guidance operating mode, annunciating the activation of the synthetic guidance operating mode on a head-up display device and on a head-down display device.

Activating the synthetic vision guidance operating mode may comprise causing a head-up display device of a flight deck of the aircraft to display an image comprising synthetic vision without enhanced vision.

Activating the synthetic vision guidance operating mode may comprise causing a head-down display device of the flight deck of the aircraft to display the image comprising synthetic vision without enhanced vision.

Activating the synthetic vision guidance operating mode may comprise annunciating the activation of the synthetic guidance operating mode on the head-up display device and on the head-down display device.

Embodiments can include combinations of the above features.

In a further aspect, the disclosure describes a vision guidance system of an aircraft. The system comprises:

a synthetic vision system;

an enhanced vision system;

one or more data processors operatively coupled to the synthetic vision system and to the enhanced vision system; and non-transitory machine-readable memory operatively coupled to the one or more data processors and storing instructions executable by the one or more processors and configured to cause the one or more processors to:

cause arming of a combined vision guidance operating mode of the vision guidance system after receiving an input indicative of a desired activation of the combined vision guidance operating mode and before the aircraft has reached a threshold condition permitting activation of the combined vision guidance operating mode; and when the aircraft has reached the threshold condition, cause activation of the combined vision guidance operating mode, the combined vision guidance operating mode including use of a combination of synthetic vision and enhanced vision.

The instructions may be configured to cause the one or more processors to cause annunciation of the arming of the combined vision guidance operating mode on a display device of the aircraft.

The instructions may be configured to cause the one or more processors to cause annunciation of the activation of the combined vision guidance operating mode on the display device of the aircraft.

The annunciation of the arming of the combined vision guidance operating mode may comprise displaying an indication in a first color on the display device. The annunciation of the activation of the combined vision guidance operating mode may comprise displaying the indication in a second color different from the first color on the display device.

The display device may be a primary flight display device.

The instructions may be configured to cause the one or more processors to cause a performance of one or more aircraft system checks before arming the combined vision guidance operating mode.

The instructions may be configured to cause the one or more processors to cause arming of the combined vision guidance operating mode when a decision height or a decision altitude has been entered into a radio altitude monitor of the aircraft and the aircraft is higher than the decision height or the decision altitude.

The instructions may be configured to cause the one or more processors to cause arming of the combined vision guidance operating mode when a synthetic vision image is displayed on a display device of the aircraft.

The instructions may be configured to cause the one or more processors to cause arming of the combined vision guidance operating mode when the aircraft is within a prescribed distance of the aircraft from a destination airport or runway.

The instructions may be configured to cause the one or more processors to cause arming of the combined vision guidance operating mode when the aircraft is within a horizontal guidance of an instrument landing system localizer.

The instructions may be configured to cause the one or more processors to cause arming of the combined vision guidance operating mode when a radio altitude acquired by the aircraft is valid.

The instructions may be configured to cause the one or more processors to cause arming of the combined vision guidance operating mode when the synthetic vision system of the aircraft does not have a failure.

The instructions may be configured to cause the one or more processors to cause arming of the combined vision guidance operating mode when a database of the synthetic vision system is unexpired.

The instructions may be configured to cause the one or more processors to cause arming of the combined vision guidance operating mode when the enhanced vision system of the aircraft does not have a failure.

The instructions may be configured to cause the one or more processors to cause arming of the combined vision guidance operating mode when a global navigation satellite system (GNSS) of the aircraft is in a satellite-based augmentation system (SBAS) mode of operation.

The instructions may be configured to cause the one or more processors to:

after activating the combined vision guidance operating mode, determine that the enhanced vision is unavailable; then cause automatic deactivation of the combined vision guidance operating mode; and cause automatic activation of a synthetic vision guidance operating mode including the use of synthetic vision without enhanced vision.

The instructions may be configured to cause the one or more processors to cause annunciation of the activation of the synthetic guidance operating mode.

The threshold condition may comprise an altitude of the aircraft.

The threshold condition may comprise a distance of the aircraft from a runway.

Embodiments can include combinations of the above features.

In a further aspect, the disclosure describes a method for operating a vision guidance system of an aircraft. The method comprises:

receiving an input indicative of a desired activation of a combined vision guidance operating mode of the vision guidance system, the input being received before the aircraft has reached a threshold condition permitting activation of the combined vision guidance operating mode;

arming the combined vision guidance operating mode; and when the aircraft has reached the threshold condition, activating the combined vision guidance operating mode, the combined vision guidance operating mode including use of a combination of synthetic vision and enhanced vision.

The method may comprise annunciating the arming of the combined vision guidance operating mode on a display device of the aircraft.

The method may comprise annunciating the activation of the combined vision guidance operating mode on the display device of the aircraft.

Annunciating the arming of the combined vision guidance operating mode may comprise displaying an indication in a first color on the display device. Annunciating the activation of the combined vision guidance operating mode may comprise displaying the indication on the display device in a second color different from the first color.

The display device may be a primary flight display device.

The method may comprise performing one or more aircraft system checks before arming the combined vision guidance operating mode.

The method may comprise arming the combined vision guidance operating mode when a decision height or a decision altitude has been entered into a radio altitude monitor of the aircraft and the aircraft is higher than the decision height or the decision altitude.

The method may comprise arming the combined vision guidance operating mode when a synthetic vision image is displayed on a display device of the aircraft.

The method may comprise arming the combined vision guidance operating mode when the aircraft is within a prescribed distance of the aircraft from a destination airport or runway.

The method may comprise arming the combined vision guidance operating mode when the aircraft is within a horizontal guidance of an instrument landing system localizer.

The method may comprise arming the combined vision guidance operating mode when a radio altitude acquired by the aircraft is valid.

The method may comprise arming the combined vision guidance operating mode when a synthetic vision system of the aircraft does not have a failure.

The method may comprise arming the combined vision guidance operating mode when a database of the synthetic vision system is unexpired.

The method may comprise arming the combined vision guidance operating mode when an enhanced vision system of the aircraft does not have a failure.

The method may comprise arming the combined vision guidance operating mode when a global navigation satellite system (GNSS) of the aircraft is in a satellite-based augmentation system (SBAS) mode of operation.

The method may comprise:

after activating the combined vision guidance operating mode, determining that the enhanced vision is unavailable; then automatically deactivating the combined vision guidance operating mode; and automatically activating a synthetic vision guidance operating mode including the use of synthetic vision without enhanced vision.

The method may comprise annunciating the activation of the synthetic guidance operating mode.

The threshold condition may comprise an altitude of the aircraft.

The threshold condition may comprise a distance of the aircraft from a runway.

Embodiments can include combinations of the above features.

In a further aspect, the disclosure describes a vision guidance system of an aircraft. The system comprises:

a synthetic vision system;

one or more data processors operatively coupled to the synthetic vision system; and non-transitory machine-readable memory operatively coupled to the one or more data processors and storing instructions executable by the one or more processors and configured to cause the one or more processors to:

cause arming of a synthetic vision guidance operating mode of the vision guidance system after receiving an input indicative of a desired activation of the synthetic vision guidance operating mode and before the aircraft has reached a threshold condition permitting activation of the synthetic vision guidance operating mode; and when the aircraft has reached the threshold condition, cause activation of the synthetic vision guidance operating mode.

The instructions may be configured to cause the one or more processors to cause annunciation of the arming of the synthetic vision guidance operating mode on a display device of the aircraft.

The instructions may be configured to cause the one or more processors to cause a performance of one or more aircraft system checks before arming the synthetic vision guidance operating mode.

The instructions may be configured to cause the one or more processors to cause arming of the synthetic vision guidance operating mode when a decision height or a decision altitude has been entered into a radio altitude monitor of the aircraft and the aircraft is higher than the decision height or the decision altitude.

The instructions may be configured to cause the one or more processors to cause arming of the synthetic vision guidance operating mode when a synthetic vision image is displayed on a display device of the aircraft.

The instructions may be configured to cause the one or more processors to cause arming of the synthetic vision guidance operating mode when the aircraft is within a prescribed distance from a destination airport or runway.

The instructions may be configured to cause the one or more processors to cause arming of the synthetic vision guidance operating mode when the aircraft is within a horizontal guidance of an instrument landing system localizer.

The instructions may be configured to cause the one or more processors to cause arming of the synthetic vision guidance operating mode when a radio altitude acquired by the aircraft is valid.

The instructions may be configured to cause the one or more processors to cause arming of the synthetic vision guidance operating mode when the synthetic vision system of the aircraft does not have a failure.

The instructions may be configured to cause the one or more processors to cause arming of the synthetic vision guidance operating mode when a database of the synthetic vision system is unexpired.

The instructions may be configured to cause the one or more processors to cause arming of the synthetic vision guidance operating mode when a global navigation satellite system (GNSS) of the aircraft is in a satellite-based augmentation system (SBAS) mode of operation.

Embodiments can include combinations of the above features.

In a further aspect, the disclosure describes a method for operating a vision guidance system of an aircraft. The method comprises:

receiving an input indicative of a desired activation of a synthetic vision guidance operating mode of the vision guidance system, the input being received before the aircraft has reached a threshold condition permitting activation of the synthetic vision guidance operating mode;

arming the synthetic vision guidance operating mode; and when the aircraft has reached the threshold condition, activating the synthetic vision guidance operating mode.

The method may comprise annunciating the arming of the synthetic vision guidance operating mode on a display device of the aircraft.

The method may comprise performing one or more aircraft system checks before arming the synthetic vision guidance operating mode.

The method may comprise arming the synthetic vision guidance operating mode when a decision height or a decision altitude has been entered into a radio altitude monitor of the aircraft and the aircraft is higher than the decision height or the decision altitude.

The method may comprise arming the synthetic vision guidance operating mode when a synthetic vision image is displayed on a display device of the aircraft.

The method may comprise arming the synthetic vision guidance operating mode when the aircraft is within a prescribed distance from a destination of the aircraft.

The method may comprise arming the synthetic vision guidance operating mode when the aircraft is within the horizontal guidance of an instrument landing system localizer.

The method may comprise arming the synthetic vision guidance operating mode when a radio altitude acquired by the aircraft is valid.

The method may comprise arming the synthetic vision guidance operating mode when a synthetic vision system of the aircraft does not have a failure.

The method may comprise arming the synthetic vision guidance operating mode when a database of the synthetic vision system is unexpired.

The method may comprise arming the synthetic vision guidance operating mode when a global navigation satellite system (GNSS) of the aircraft is in a satellite-based augmentation system (SBAS) mode of operation.

Embodiments can include combinations of the above features.

In a further aspect, the disclosure describes a vision guidance system of an aircraft. The system comprises:
a synthetic vision system;
an enhanced vision system;
a multifunction controller disposed in a glare shield panel of the aircraft;
one or more data processors operatively coupled to the multifunction controller, to the synthetic vision system and to the enhanced vision system; and
non-transitory machine-readable memory operatively coupled to the one or more data processors and storing instructions executable by the one or more processors and configured to cause the one or more processors to:
after receiving an input indicative of a desired activation of a combined vision guidance operating mode of the vision guidance system via the multifunction controller, cause activation of the combined vision guidance operating mode, the combined vision guidance operating mode including use of a combination of synthetic vision and enhanced vision.

The instructions may be configured to cause the one or more processors to, after receiving the input, cause arming of the combined vision guidance operating mode before activating the combined vision guidance operating mode.

The instructions may be configured to cause the one or more processors to:
cause annunciation of the arming of the combined vision guidance operating mode on one or more display devices of the aircraft; and
upon the activation of the combined vision guidance operating mode, cause annunciation of the activation of the combined vision guidance operating mode on the one or more display devices.

The instructions may be configured to cause the one or more processors to cause activation of the combined vision guidance operating mode after a threshold condition has been met.

The threshold condition may comprise an altitude of the aircraft.

Causing activation of the combined vision guidance operating mode may comprise automatically causing a primary flight display device and a head-up display device of a flight deck of the aircraft to each display an image comprising synthetic vision.

The input may be a first input and the instructions may be configured to cause the one or more processors to, after receiving a second input via the multifunction controller, the second input being indicative of a desired change in display mode of a head-down display of a flight deck of the aircraft, execute the change in display mode of the head-down display.

The change in display mode may be a transition to an image comprising synthetic vision.

The change in display mode may be a transition to an image comprising a combination of synthetic vision and enhanced vision.

The change in display mode may be a transition to an image that excludes synthetic vision and enhanced vision.

Embodiments can include combinations of the above features.

In a further aspect, the disclosure describes a method for operating a vision guidance system of an aircraft. The method comprises:
receiving an input via a multifunction controller disposed in a glare shield panel of the aircraft, the input being indicative of a desired activation of a combined vision guidance operating mode of the vision guidance system; and
activating the combined vision guidance operating mode, the combined vision guidance operating mode including use of a combination of synthetic vision and enhanced vision.

The method may comprise, after receiving the input, arming the combined vision guidance operating mode before activating the combined vision guidance operating mode.

The method may comprise:
annunciating the arming of the combined vision guidance operating mode on one or more display devices of the aircraft; and
upon the activation of the combined vision guidance operating mode, annunciating the activation of the combined vision guidance operating mode on the one or more display devices.

The method may comprise activating the combined vision guidance operating mode after a threshold condition has been met.

The threshold condition may comprise an altitude of the aircraft.

Activating the combined vision guidance operating mode may comprise automatically causing a primary flight display device and a head-up display device of a flight deck of the aircraft to each display an image comprising synthetic vision.

The input may be a first input and the method may comprise:
receiving a second input via the multifunction controller, the second input being indicative of a desired change in display mode of a head-down display of a flight deck of the aircraft; and
executing the change in display mode of the head-down display.

The change in display mode may be a transition to an image comprising synthetic vision.

The change in display mode may be a transition to an image comprising a combination of synthetic vision and enhanced vision.

The change in display mode may be a transition to an image that excludes synthetic vision and enhanced vision.

Embodiments can include combinations of the above features.

In a further aspect, the disclosure describes a vision guidance system of an aircraft. The system comprises:
a synthetic vision system;
one or more data processors operatively coupled to the synthetic vision system; and
non-transitory machine-readable memory operatively coupled to the one or more data processors and storing instructions executable by the one or more processors and configured to cause the one or more processors to:
receive an input indicative of a desired activation of an equivalent vision guidance operating mode using the synthetic vision system before the aircraft has reached a threshold condition permitting activation of an equivalent vision guidance operating mode;
cause a performance of one or more aircraft system checks to determine a capability of one or more aircraft systems;

when the capability of the one or more aircraft systems permits the use of the equivalent vision guidance operating mode of the vision guidance system, cause a first annunciation indicative of the equivalent vision guidance operating mode being armed; and when the capability of the one or more aircraft systems prevents the use of the equivalent vision guidance operating mode of the vision guidance system, cause a second annunciation indicative of the equivalent vision guidance operating mode being unavailable.

The instructions may be configured to cause the one or more processors to cause the first annunciation when a decision height or a decision altitude has been entered into a radio altitude monitor of the aircraft and the aircraft is higher than the decision height or the decision altitude.

The instructions may be configured to cause the one or more processors to cause the first annunciation when a synthetic vision image is displayed on a display device of the aircraft.

The instructions may be configured to cause the one or more processors to cause the first annunciation when the aircraft is within a prescribed distance from a destination airport or runway.

The instructions may be configured to cause the one or more processors to cause the first annunciation when the aircraft is within a horizontal guidance of an instrument landing system localizer.

The instructions may be configured to cause the one or more processors to cause the first annunciation when a radio altitude acquired by the aircraft is valid.

The instructions may be configured to cause the one or more processors to cause the second annunciation when the synthetic vision system has failed.

The instructions may be configured to cause the one or more processors to cause the second annunciation when a database of the synthetic vision system is expired.

The instructions may be configured to cause the one or more processors to cause the first annunciation when a global navigation satellite system (GNSS) of the aircraft is in a satellite-based augmentation system (SBAS) mode of operation.

Embodiments can include combinations of the above features.

In a further aspect, the disclosure describes a method for operating a vision guidance system of an aircraft. The method comprises:

receiving an input indicative of a desired activation of an equivalent vision guidance operating mode using synthetic vision, the input being received before the aircraft has reached a threshold condition permitting activation of the equivalent vision guidance operating mode;

performing one or more aircraft system checks to determine a capability of one or more aircraft systems;

when the capability of the one or more aircraft systems permits the use of the equivalent vision guidance operating mode, causing a first annunciation indicative of the equivalent vision guidance operating mode being armed; and when the capability of the one or more aircraft systems prevents the use of the equivalent vision guidance operating mode, causing a second annunciation indicative of the equivalent vision guidance operating mode being unavailable.

The method may comprise causing the first annunciation when a decision height or a decision altitude has been entered into a radio altitude monitor of the aircraft and the aircraft is higher than the decision height or the decision altitude.

The method may comprise causing the first annunciation when a synthetic vision image is displayed on a display device of the aircraft.

The method may comprise causing the first annunciation when the aircraft is within a prescribed distance from a destination airport or runway.

The method may comprise causing the first annunciation when the aircraft is within a horizontal guidance of an instrument landing system localizer.

The method may comprise causing the first annunciation when a radio altitude acquired by the aircraft is valid.

The method may comprise causing the second annunciation when a synthetic vision system of the aircraft has failed.

The method may comprise causing the second annunciation when a database of the synthetic vision system is expired.

The method may comprise causing the first annunciation when a global navigation satellite system (GNSS) of the aircraft is in a satellite-based augmentation system (SBAS) mode of operation.

Embodiments can include combinations of the above features.

In a further aspect, the disclosure describes an aircraft comprising a system as described herein.

Further details of these and other aspects of the subject matter of this application will be apparent from the detailed description included below and the drawings.

DESCRIPTION OF THE DRAWINGS

Reference is now made to the accompanying drawings, in which:

FIGS. 10A-10D are a schematic representations of head-up display devices and head-down display devices under different operating modes;

FIG. 14A illustrates a truth table for use by the vision guidance system of FIG. 2;

FIG. 14B illustrates a definition table with exemplary conditions from the truth table of FIG. 14A;

FIGS. 16A-16D show a schematic representation of a flight path of the aircraft of FIG. 1 from a cruise phase of flight to toward a destination runway with exemplary locations along the flight path where annunciations are provided;

FIG. 17 is a flow diagram of another exemplary method for operating a combined vision guidance operating mode of a vision guidance system of an aircraft;

FIG. 18 is a flow diagram of an exemplary method for operating a vision guidance system of an aircraft;

FIG. 19 is a flow diagram of another exemplary method for operating a vision guidance system of an aircraft; and FIG. 20 is a flow diagram of another exemplary method for operating a vision guidance system of an aircraft.

DETAILED DESCRIPTION

The following disclosure describes systems and methods useful in providing equivalent visual operation (EVO) for the flight crew of an aircraft independent of the actual outside weather and visibility conditions. In some embodiments, the systems and methods described herein can contribute toward gaining an operational credit that can expand the operational capabilities of an aircraft. For example, the systems and methods described herein can contribute toward the ability to use the same or substantially the same operating procedures for an aircraft independently of the actual weather conditions. In some embodiments, the systems and methods described herein can, for example, contribute toward lowering an operating minima such as a decision height (DH) or a decision altitude (DA) at which, if the required visual reference (such as the runway markings or runway environment) to continue an approach is not visible to the pilot, the pilot must initiate a missed approach (e.g., go around).

The systems and methods described herein can, in some embodiments, create a virtual visual flight environment for the flight crew, independent of the actual outside weather and visibility conditions, through the use of synthetic vision (SV) and enhanced vision (EV) technologies. In some embodiments, the virtual visual environment can comprise a complementary use of SV and EV technologies by combining (e.g., fusing) SV and EV information to generate images that contain both SV and EV information merged together. The systems and methods described herein can, in some embodiments, contribute toward enabling low visibility approach and landing operational credit by other than CAT II/III trained flight crews at an increased number and type of runways when compared to currently allowed low visibility operations.

The systems and methods described herein can, in some embodiments, contribute toward reducing the flight crew's workload at (e.g., critical) times such as during take-off or in preparation for landing an aircraft by providing simple and intuitive solutions for activating and operating such systems.

Aspects of various embodiments are described through reference to the drawings.

Figure 1:
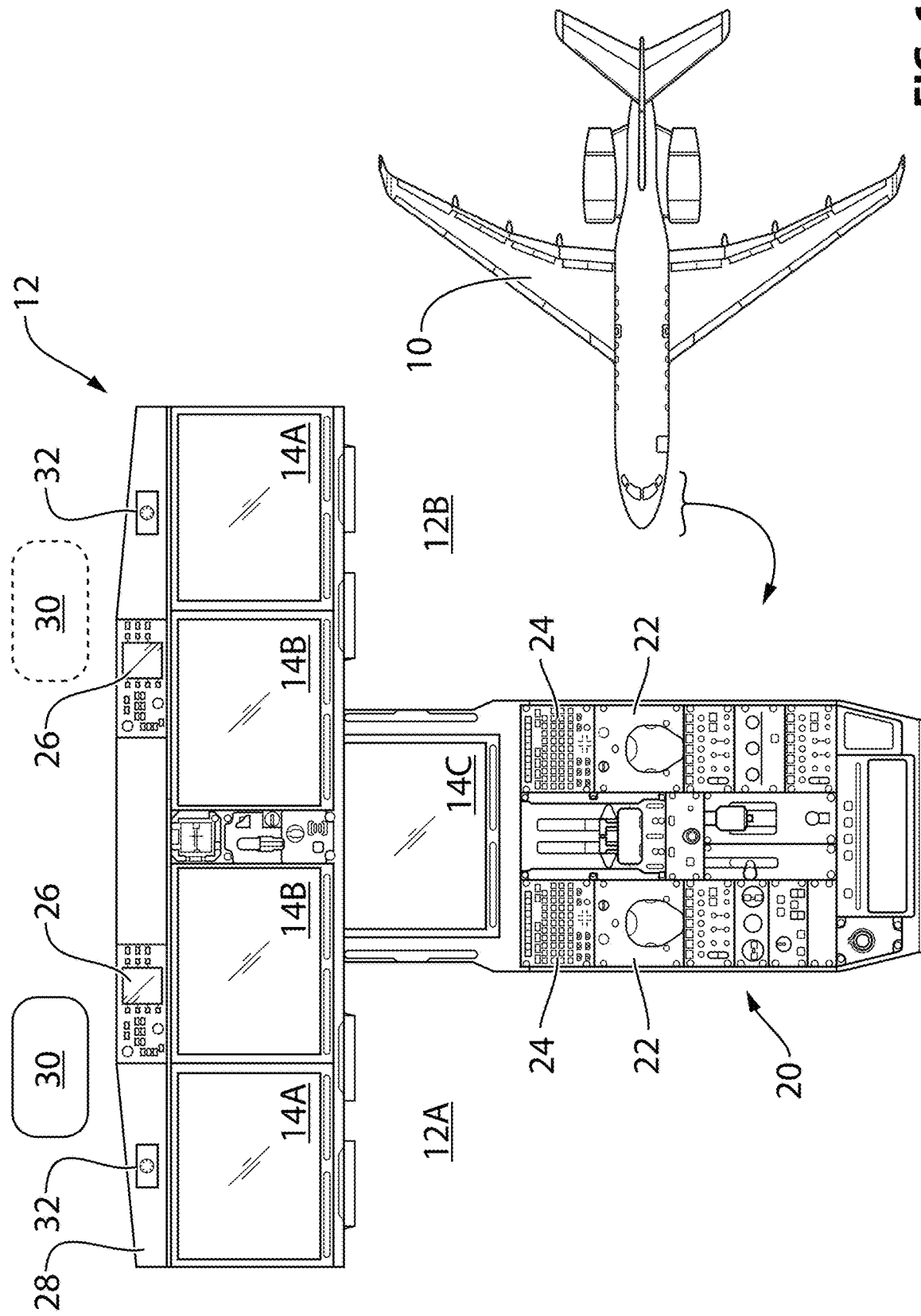
FIG. 1 shows an exemplary aircraft flight deck and a corresponding exemplary aircraft comprising the flight deck.

FIG. 1 shows an exemplary aircraft 10 and a partial schematic representation of flight deck 12 which may be part of aircraft 10. Aircraft 10 can be a corporate, private, commercial or any other type of aircraft. For example, aircraft 10 can be a fixed-wing aircraft. In some embodiments, aircraft 10 can be a narrow-body, twin engine jet airliner or an ultra-long range business jet. Aircraft 10 can comprise a vision guidance system as described further below. Flight deck 12 can comprise additional or fewer elements than those shown and described herein. Flight deck 12 can comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B can comprise functionally identical components so that at least some operational redundancy is provided between left portion 12A and right portion 12B of flight deck 12. As used herein, the term "flight crew" is intended to encompass one or more individuals responsible for the operation of aircraft 10 during flight. Such individuals may, for example, include the pilot and/or the co-pilot.

Flight deck 12 can comprise one or more display devices providing respective display areas. In the exemplary configuration of flight deck 12 shown in FIG. 1, left portion 12A and right portion 12B can each comprise primary flight display 14A (referred hereinafter as "PFD 14A") and multifunction display 14B (referred hereinafter as "MFD 14B"). In some embodiments, flight deck 12 can also comprise an additional display 14C provided in pedestal region 20 of flight deck 12 and that can be shared between the pilot and the co-pilot during normal operation of aircraft 10. PFD 14A, MFD 14B and shared display 14C can each be considered a "head-down display" (HDD) and are referred generally herein as HDD 14. HDDs 14 can include one or more cathode-ray tubes (CRTs), liquid crystal displays (LCDs), plasma displays, light-emitting diode (LED) based displays or any type of display device that may be suitable for use in flight deck 12. HDDs 14 can be configured to dynamically display operational and status information about various systems of aircraft 10, information related to flight/mission planning, maps and any other information that may be useful for the flight crew (e.g., pilot(s)) during the operation of aircraft 10. HDDs 14 can facilitate dialog between the flight crew and various systems of aircraft 10 via suitable graphical user interfaces.

Flight deck 12 can comprise one or more data input devices such as, for example, one or more cursor control devices 22, one or more multifunction keypads 24, one or more (e.g., standalone or multifunction) controllers 26 (referred hereinafter in the singular) and one or more HUD mode selectors 32 that can permit data entry by the flight crew. For example, such controller 26 may be disposed in glare shield panel 28 above PFD 14A and MFD 14B. Controller 26 can be of the type known as a "control tuning panel" (CTP), a "radio tuning panel" (RTP) or a "radio tuning unit" (RTU). For example, controller 26 can facilitate radio management functions and can provide a convenient means of selecting frequencies, codes, channels, operating modes, volume and optionally other functions. As explained in more detail below, controller 26 can be configured to facilitate the operation of a vision guidance system of aircraft 10.

Flight deck 12 can also comprise one or more head-up display devices 30 (referred hereinafter as "HUD 30") which can comprise transparent displays that can present data without requiring the pilots to look away from their usual point out the windshield of aircraft 10. HUD 30 can present information to a pilot while the pilot's head is positioned "up" and looking forward, instead of angled down looking at lower instruments or displays such as HDDs 14. In various embodiments, right and left portions 12A, 12B may each comprise HUD 30 or, alternatively, flight deck 12 can comprise only one HUD 30 disposed in left portion 12A of flight deck 12 for example.

HUD mode selectors 32 can be disposed in glare shield panel 28 of flight deck 12. HUD mode selector 32 can comprise a pilot input device (e.g., knob) that is actuatable by the pilot to facilitate the selection of an operating (e.g., display) mode for HUD 30.

Even though aspects of this disclosure refer specifically to the use of display devices onboard aircraft 10, it is understood that the vision guidance system of aircraft 10 could be used in conjunction with one or more display devices that are off of aircraft 10 (e.g., at a ground station) to assist a remote (e.g., ground-based) operator (e.g., pilot) of aircraft 10.

Figure 2:
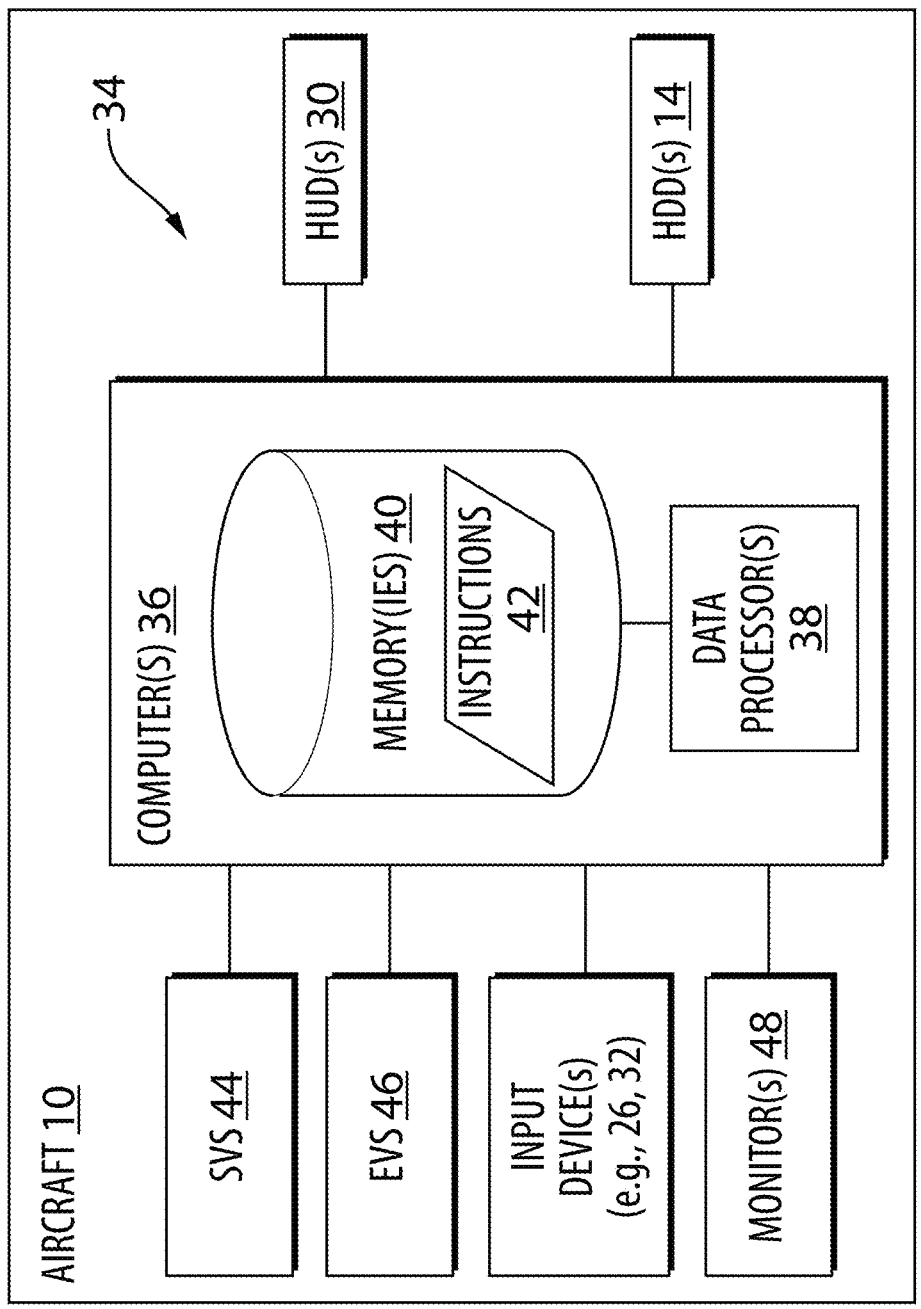
FIG. 2 shows a schematic representation of an exemplary vision guidance system of the aircraft of FIG. 1.

FIG. 2 shows a schematic representation of an exemplary vision guidance system 34 of aircraft 10. Part(s) of vision guidance system 34 can be integrated with flight deck 12. Vision guidance system 34 can comprise one or more computers 36 (referred hereinafter in the singular) operatively coupled to one or more display devices such as HUD 30 and/or HDD 14 of flight deck 12. Computer 36 can comprise one or more data processors 38 (referred hereinafter in the singular) and one or more computer-readable memories 40 (referred hereinafter in the singular) storing machine-readable instructions 42 executable by data processor 38 and configured to cause data processor 38 to generate one or more outputs (e.g., signals) for causing the execution of steps of the methods described herein.

Computer 36 can be part of an avionics suite of aircraft 10. For example, in some embodiments, computer 36 can carry out additional functions than those described herein including the management of one or more graphic user interfaces of flight deck 12 and/or other part(s) of aircraft 10. In various embodiments, computer 36 can comprise more than one computer or data processor where the methods disclosed herein (or part(s) thereof) could be performed using a plurality of computers 36 or data processors 38, or, alternatively, be performed entirely using a single computer 36 or data processor 38.

Data processor 38 can comprise any suitable device(s) configured to cause a series of steps to be performed by computer 36 so as to implement a computer-implemented process such that instructions 42, when executed by computer 36 or other programmable apparatus, can cause the functions/acts specified in the methods described herein to be executed.

Memory 40 can comprise any suitable machine-readable storage medium. Memory 40 can comprise non-transitory computer readable storage medium such as, for example, but not limited to, an electronic, magnetic, optical, electromagnetic, infrared, or semiconductor system, apparatus, or device, or any suitable combination of the foregoing. Memory 40 can include a suitable combination of any type of computer memory that is located either internally or externally to computer 36. Memory 40 can comprise any storage means (e.g. devices) suitable for retrievably storing machine-readable instructions 42 executable by data processor 38.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) (e.g., memory 40) having computer readable program code (e.g., instructions 42) embodied thereon. Computer program code for carrying out operations for aspects of the present disclosure in accordance with instructions 42 can be written in any combination of one or more programming languages. Such program code can be executed entirely or in part by computer 36 or other data processing device(s). It is understood that, based on the present disclosure, one skilled in the relevant arts could readily write computer program code for implementing the methods disclosed herein.

Computer 36 can be operatively connected to HUD 30 and/or HDD 14 so that output from computer 36 can at least partially control the operation of HUD 30 and/or HDD 14. Vision guidance system 34 can also comprise synthetic vision system 44 (referred hereinafter as "SVS 44"), enhanced vision system 46 (referred hereinafter as "EVS 46"), pilot input devices such as controller 26 and HUD mode selector 32 and one or more system monitors 48. Computer 36 can be operatively connected to SVS 44, EVS 46, the input devices 26, 32 and system monitor(s) 48.

As explained further below, vision guidance system 34 can be operated in one or more operating modes. For example, vision guidance system 34 can be operated in a SV guidance operating mode which includes the use of SV without EV. Vision guidance system 34 can also be operated in a combined vision (CV) guidance operating mode which includes the use of a combination of SV and EV.

Figure 3:
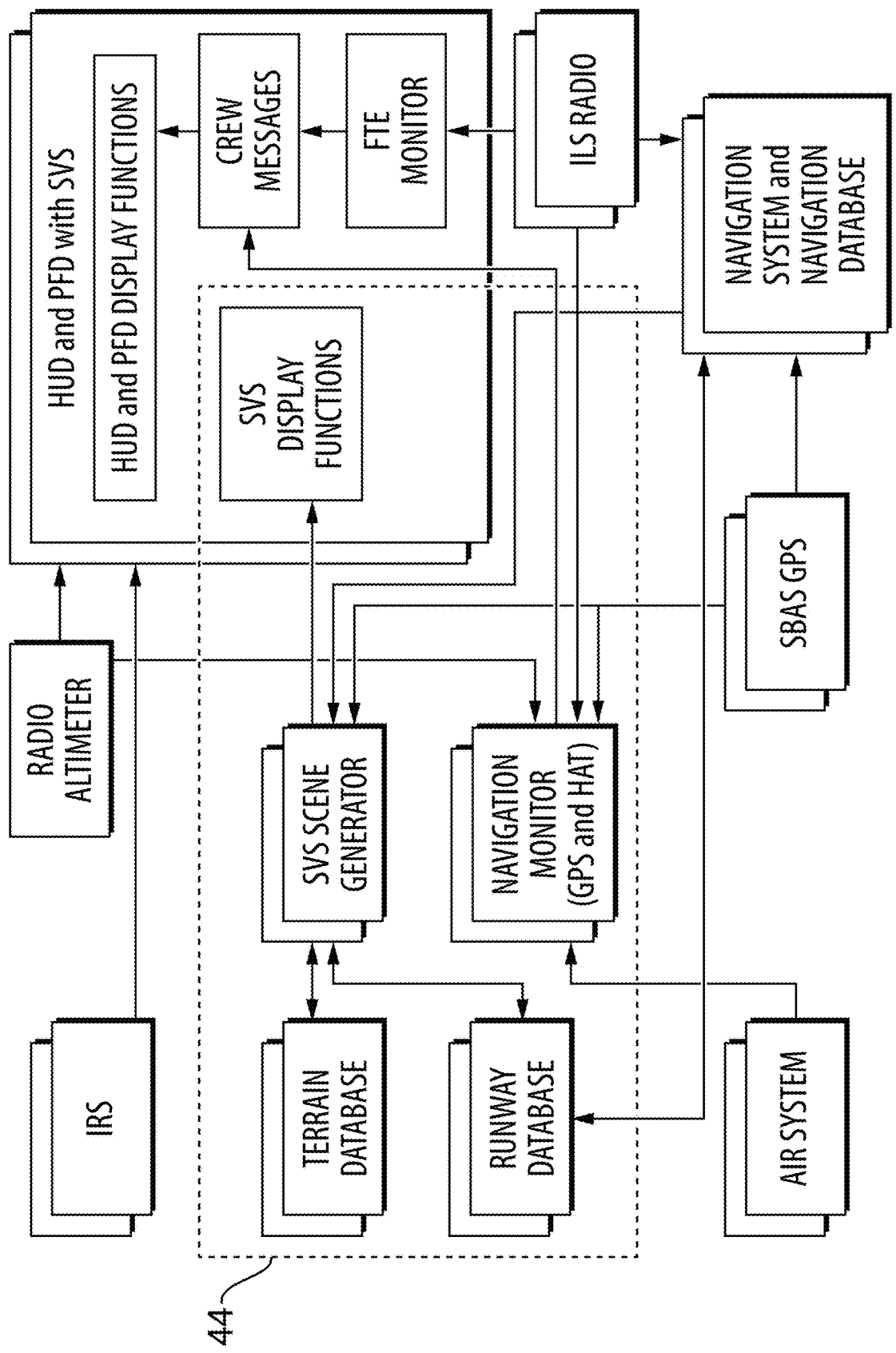
FIG. 3 is a schematic representation of an exemplary synthetic vision guidance system of the aircraft of FIG. 1.

FIG. 3 is a schematic representation of an exemplary SVS 44 of vision guidance system 34. SV can provide significant improvements in situational awareness for aircraft pilots. A typical SV system uses a computer-generated image of the external scene topography generated from aircraft attitude, navigation data, and data of the terrain and obstacles stored in one or more databases stored onboard aircraft 10. In some embodiments, SVS 44 can comprise a terrain database, a runway database, a navigation monitor and a scene generator. In some embodiments, SVS 44 can be operatively coupled to PFD 14A, HUD 30, a radio altimeter, inertial reference system (IRS), air data system, global positioning system (GPS), a navigation system and database, radio equipment of an instrument landing system (ILS) and a flight technical error (FTE) monitor. SVS 44 can be integrated into a synthetic vision guidance system (SVGS) or a combined vision guidance system (CVGS) as described below.

Figure 4:
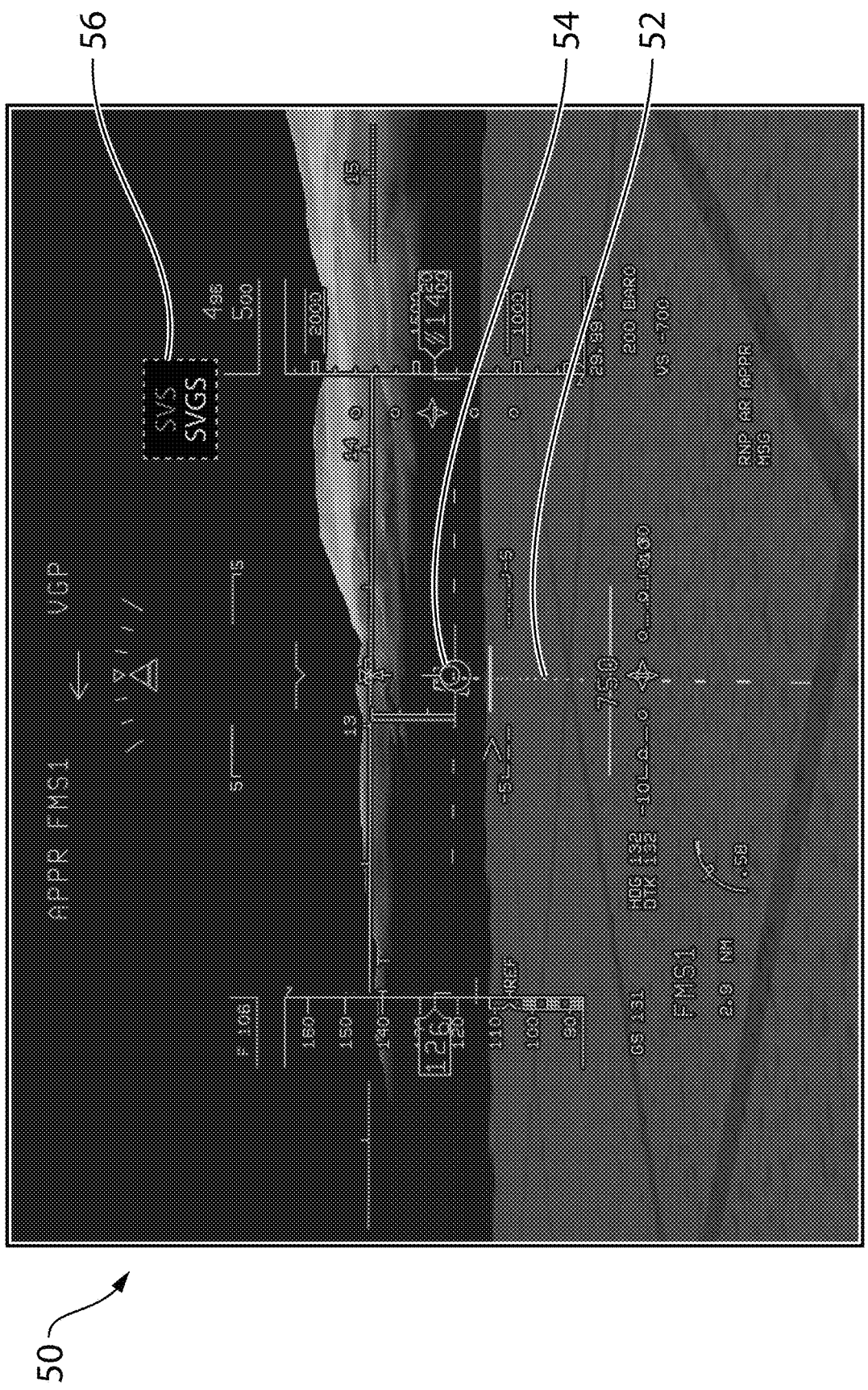
FIG. 4 is an exemplary image generated using the synthetic vision system of FIG. 3.

FIG. 4 is an exemplary SV image 50 generated using SVS 44. SVS 44 can be used to provide computer-generated SV images for display on PFD 14A, and/or on HUD 30. In some embodiments, synchronized SV images 50 can be displayed simultaneously on PFD 14A and on HUD 30. SV image 50 can contain symbology typically found on HUD 30 and/or on PFD 14A. In some embodiments, SV image 50 can contain other symbols or visual aids to assist the pilot with controlling aircraft 10. For example, SV image 50 can contain line 52 representing a desired flight path of aircraft 10 leading to a destination airport or runway. SV image 50 can also contain outline 54 outlining the destination runway. SV image 50 can also contain annunciation 56 indicating the active display mode (e.g., SVS) of the display device on which SV image 50 is displayed. Instead or in addition, annunciation 56 can indicate the active operating mode (e.g., SVGS for "synthetic vision guidance system") of vision guidance system 34. Annunciation 56 can comprise a textual and/or a graphical indication.

Figure 5:
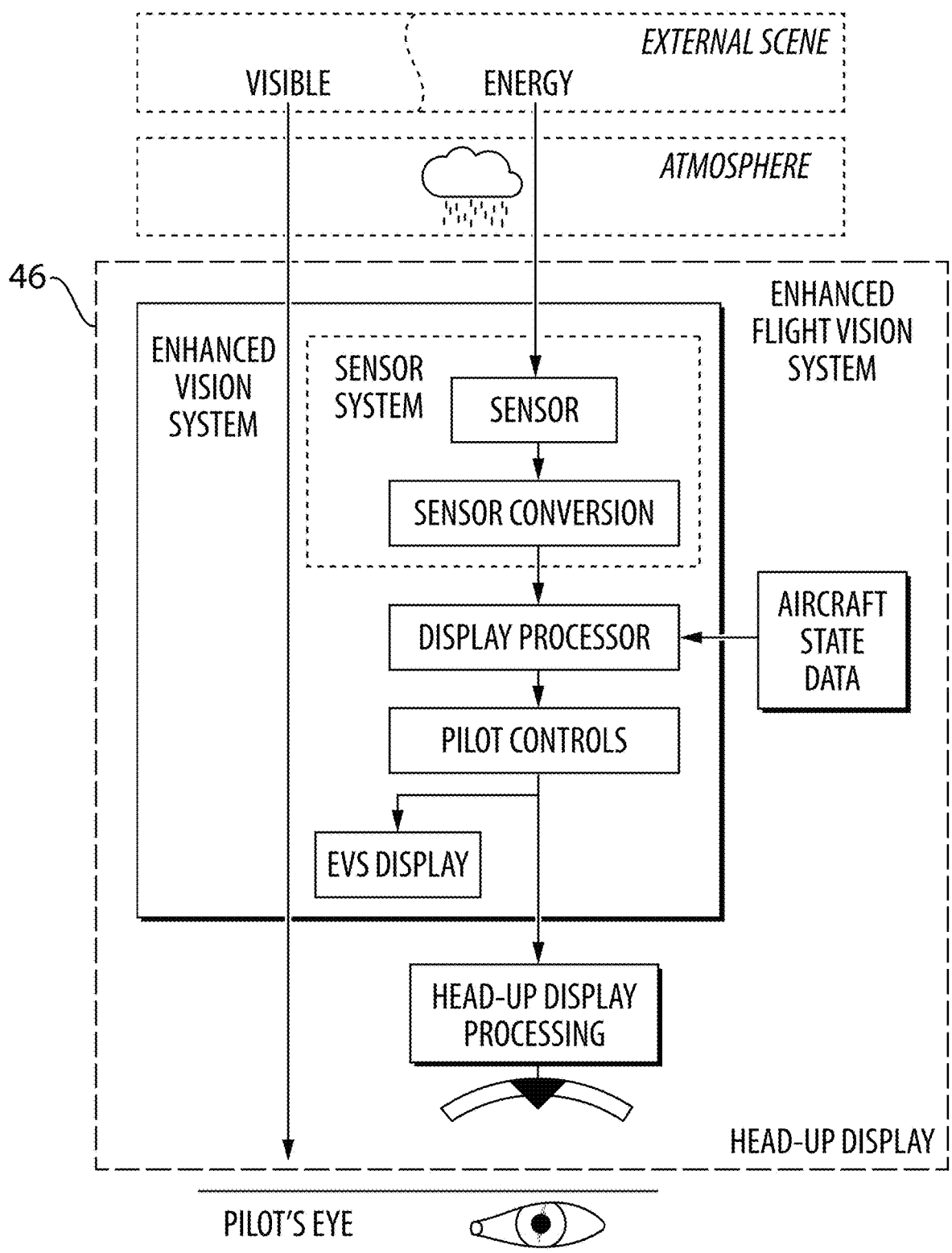
FIG. 5 is a schematic representation of an exemplary enhanced vision system of the aircraft of FIG. 1.

FIG. 5 is a schematic representation of an exemplary EVS 46 of vision guidance system 34. EVS 46 can provide a display of the external scene to the aircraft pilots by using an imaging sensor mounted to aircraft 10. EVS 46 can provide the pilot with an image which can enhance unaided human vision. EVS 46 can include one or more forward-looking imaging sensors such as a color camera, infrared camera or radar. The image can be provided to the pilot via a display device inside aircraft 10. EVS 46 can be operatively coupled to receive aircraft state data and also be operatively coupled to PFD 14A and/or HUD 30. EVS 46 can generate enhanced image data representative of a three-dimensional perspective of the scene outside (e.g., in front of) aircraft 10 for subsequent presentation on a display device such as PFD 14A and/or HUD 30 for example.

Figure 6:
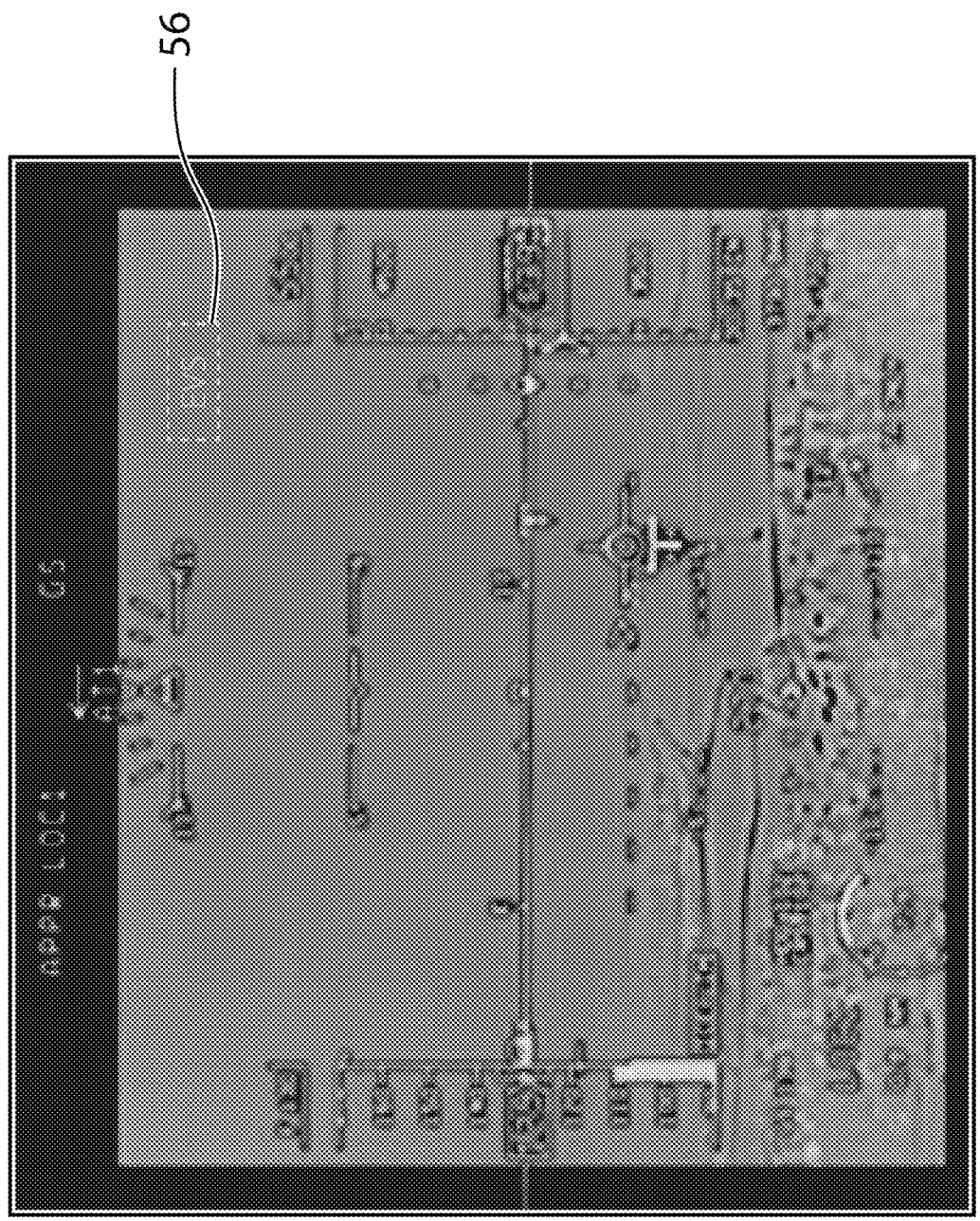
FIG. 6 is an exemplary image generated using the enhanced vision system of FIG. 5.

FIG. 6 is an exemplary enhanced vision (EV) image generated using EVS 46. EVS 46 can be used to provide EV images for display primarily on HUD 30. In some embodiments, synchronized EV images 58 can be displayed simultaneously on HDD 14 (e.g., MFD 14B or PFD 14A) and on HUD 30. EV image 58 can contain symbology typically found on HUD 30. In some embodiments, EV image 58 can contain other symbols or visual aids to assist the pilot with controlling aircraft 10. EV image 58 can also contain annunciation 56 indicating the active display mode (e.g., EVS) of the display device on which EV image 58 is displayed. Instead or in addition, annunciation 56 can indicate the active operating mode of vision guidance system 34. Annunciation 56 can comprise a textual and/or a graphical indication.

Figure 7:
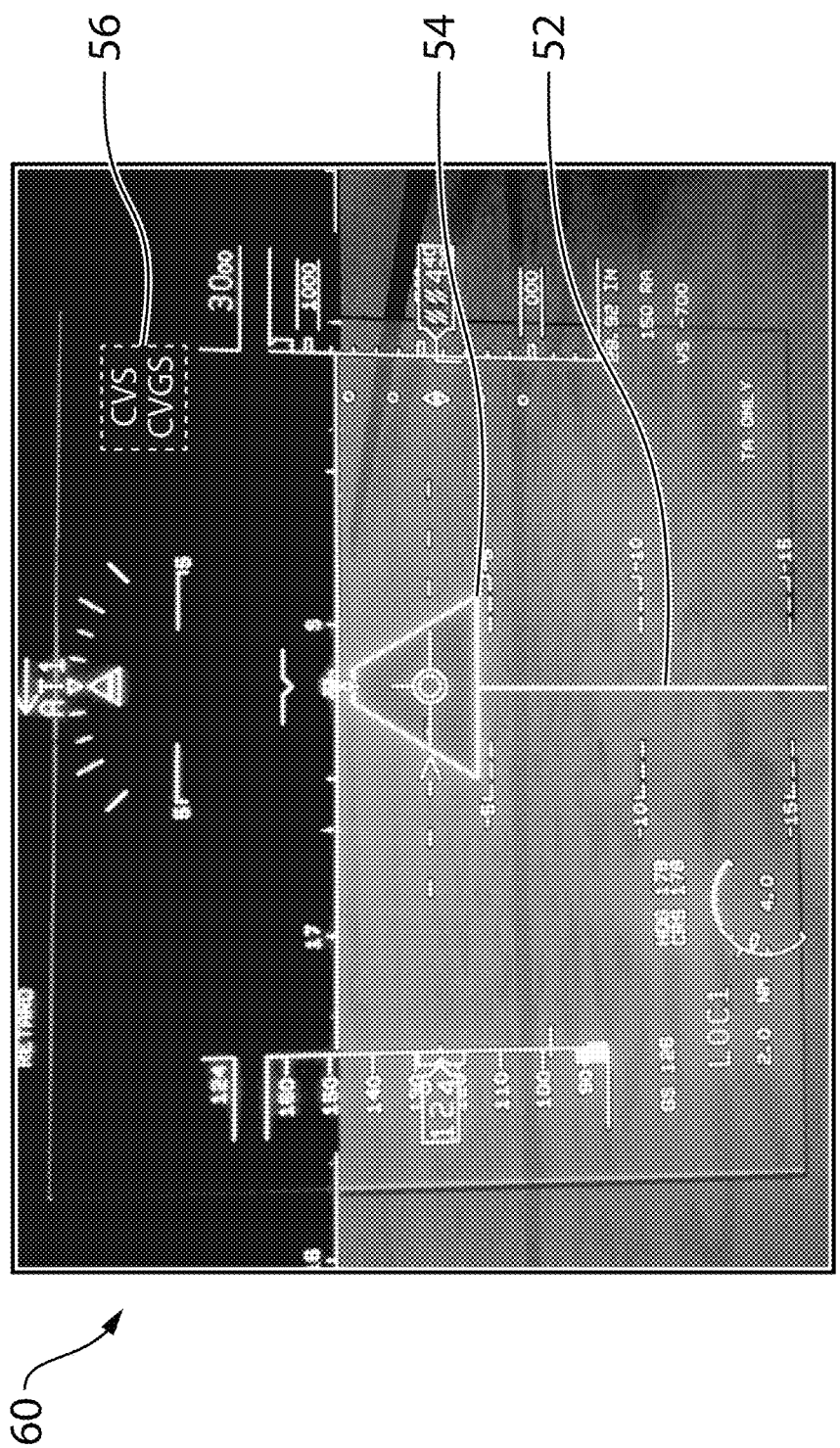
FIG. 7 is an exemplary image which combines synthetic vision and enhanced vision.

FIG. 7 is an exemplary combined vision (CV) image 60 that combines SV and EV information on the same image. CV image makes complementary use of SV and EV technologies by fusing/merging SV and EV information on a common image using a suitable method. For example, the advantages of EV can compensate for the limitations of SV and vice versa. Accordingly, the combination of SV and EV can provide a visual flight environment for the flight crew that is independent of the outside weather and visibility conditions. In some embodiments, the combination of SV and EV can provide an EVO environment so that the pilot flying has a substantially full "out the window" display. The term "substantially" as used herein may be applied to modify any quantitative representation which could permissibly vary without resulting in a change in the basic function to which it is related.

In some embodiments, synchronized CV images 60 can be displayed simultaneously on PFD 14A and on HUD 30. CV image 60 can contain symbology typically found on HUD 30 and/or on PFD 14A. In some embodiments, CV image 60 can contain other symbols or visual aids to assist the pilot with controlling aircraft 10. For example, CV image 60 can contain line 52 representing a desired flight path of aircraft 10 leading to a destination airport or runway. CV image 60 can also contain outline 54 outlining the destination runway. CV image 60 can also contain annunciation 56 indicating the active display mode (e.g., CVS for "combined vision system") of the display device on which CV image 60 is displayed. Instead or in addition, annunciation 56 can indicate the active operating mode (e.g., CVGS) of vision guidance system 34. Annunciation 56 can comprise a textual and/or a graphical indication.

Vision guidance system 34 can provide enhanced situational awareness for the flight crew and can also contribute toward obtaining an operational credit (e.g., lower operating minima) for aircraft 10 by combining the benefits of CV with suitable system/performance monitoring. The CVGS operating mode for operational credit can be more stringent than the CVS display mode for situational awareness alone. Similarly, the SVGS operating mode for operational credit can be more stringent than the SVS display mode for situational awareness alone. The CVGS operating mode can be based on a solution that blends the SVGS for operational credit, with the EVS image that is providing enhanced visual cues during the visual segment. Sufficient guidance information can be provided by vision guidance system 34 and/or other aircraft systems to help the flight crew monitor the progress and safety of the approach down to the lower-than-standard decision height and provide alerting upon any excessive lateral and vertical deviation from the intended flight path, navigation system error or scene positioning error during the CVGS/SVGS operation. In some embodiments, the lower-than-standard height may be lower than 200 ft (61 m) and may be 150 ft (46 m) or 100 ft (30 m) for example. The guidance functionality of the CVGS or SVGS operating modes of vision guidance system 34 can be provided at least in part via monitors 48 that can track the lateral deviation and the vertical deviation of aircraft 10 from its intended flight path, from a standard decision height such as 300 ft (91 m) down to the lower-than-standard decision height lower than 200 ft (61 m) for example. In addition, the guidance functionality can include suitable speed control (e.g., +10/−5 knots) to ensure that a smooth transition occurs throughout the approach, flare, landing and rollout segments. The SVGS operating mode can make use of SV without the use of EV for the purpose of assisting the flight crew in reaching the lower-than-standard decision height/altitude.

For example, monitors 48 can include flight technical error (FTE) monitoring to detect excessive lateral and vertical deviation, navigation system error and/or scene positioning error. In some embodiments, monitors 48 can monitor the integrity of aircraft systems that are relied upon during the approach for example. In some embodiments, monitors 48 can monitor the integrity of the terrain/obstacle database(s) of SVS 44. Such integrity monitoring of the synthetic data can be performed by comparing with data from a radar altimeter for example.

Figure 8:
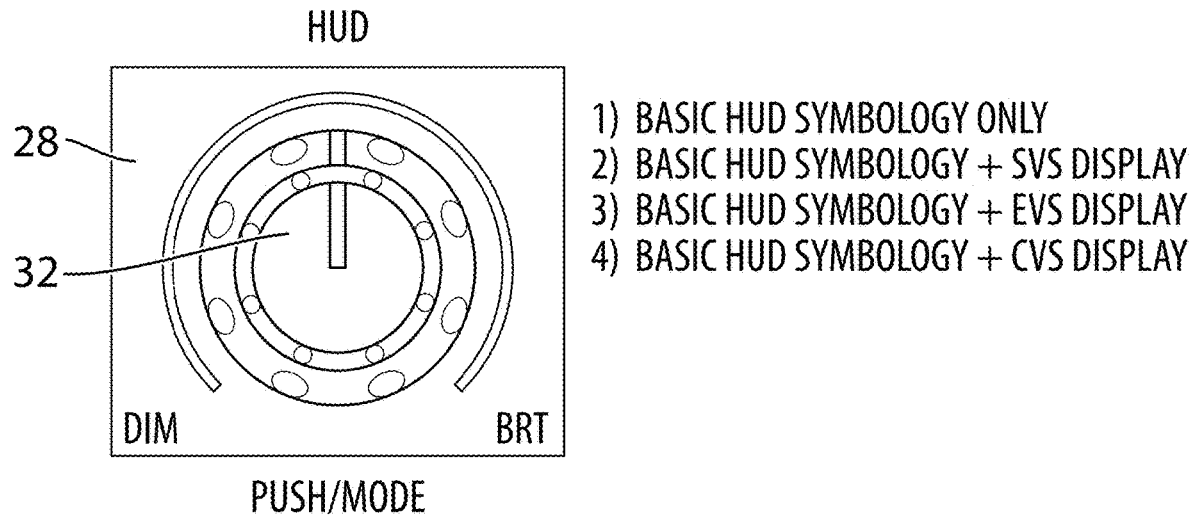
FIG. 8 shows an exemplary head-up display mode selector of the flight deck of FIG. 1.

FIG. 8 shows an exemplary HUD mode selector 32 of flight deck 12 of FIG. 1. HUD mode selector 32 can be disposed on glare shield panel 28 or at another location accessible to the flight crew. HUD mode selector 32 can comprise a rotary dial that can serve to adjust a viewing characteristic (e.g., brightness) of HUD 30. HUD mode selector 32 can also be a push button that can be used to select a display mode of HUD 30. Accordingly, repeated actuation (e.g., depressing) of HUD selector 32 can be used to cycle between different display modes of HUD 30 such as: 1) HUD symbology only without EV or SV; 2) HUD symbology+SV; 3) HUD symbology+EV; and 4) HUD symbology+CV for example. HUD mode selector 32 can be used by the flight crew to adjust the viewing characteristic or to change the display mode of HUD 30 as appropriate even if vision guidance system 34 is off.

Figure 9:
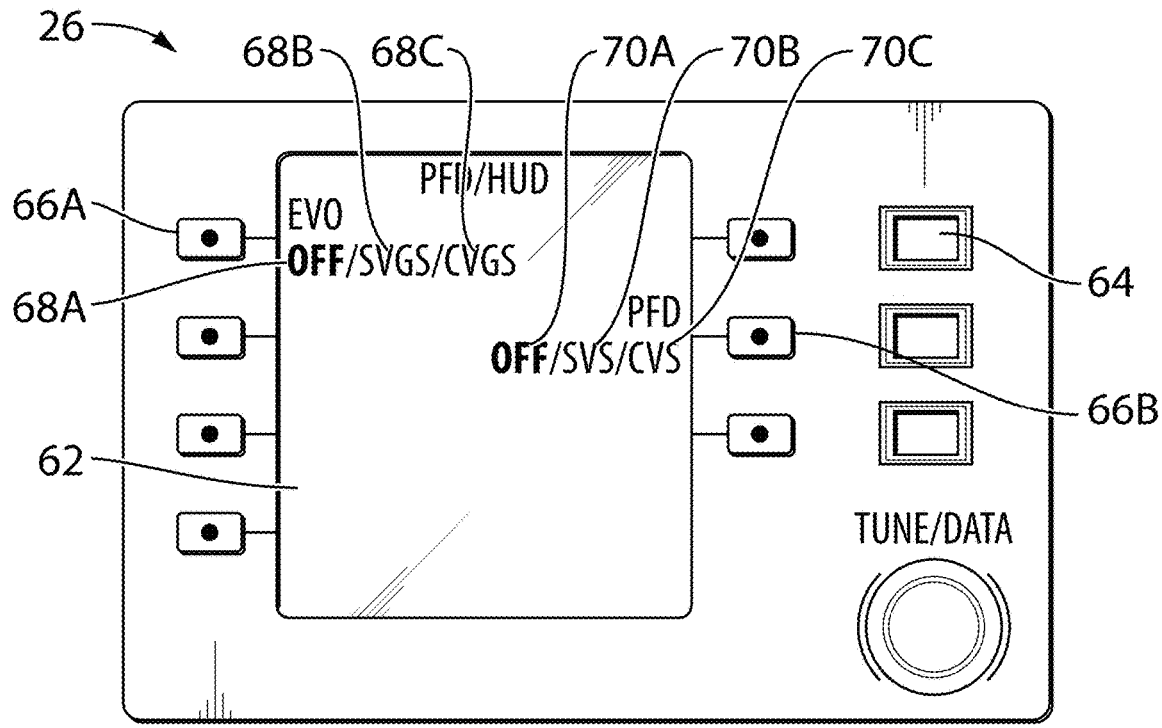
FIG. 9 shows an exemplary multifunction controller of the flight deck of FIG. 1.

FIG. 9 shows an exemplary multifunction controller 26 of flight deck 12 of FIG. 1. Controller 26 can be used to select an operating mode of vision guidance system 34 and/or select a display mode of PFD 14A. Controller 26 can comprise a display device with display area 62 within which a desired menu page can be displayed. Controller 26 can be used in association with multiple systems of aircraft 10 so the desired menu page for the applicable system can be accessed using menu button 64. Controller 26 can also comprise a plurality of line select keys 66A, 66B. In the embodiment shown, line select key 66A can serve to select an operating mode of vision guidance system 34 as labeled "EVO" in display area 62. Repeated actuation (e.g., depressing) of line select key 66A can serve to toggle between an OFF, SGVS and CVGS operating modes of vision guidance system 34. Selectable object 68A labeled "OFF" can represent an operating mode where no EVO (e.g., no SV and no EV) is provided. Selectable object 68B labeled "SVGS" is intended to represent an operating mode where SV is provided without EV, and with system/performance monitoring that is used to supplement pure situational awareness and thereby gain the operational credit. Selectable object 68C labeled "CVGS" is intended to represent an operating mode where a combination of SV and EV is provided and with system/performance monitoring that is used to supplement pure situational awareness and thereby gain the operational credit. The applicable selectable object 68A, 68B or 68C that corresponds to the active/selected operating mode of vision guidance system 34 can be visually distinct from the inactive operating modes by way of being of a different color, underlined or otherwise visually distinguished. FIG. 9 shows selectable object 68A as being currently active by way of being of a different color than selectable objects 68B and 68C.

The selection of the operating mode of vision guidance system 34 via selectable objects 68A-68C displayed on multifunction display 26 can automatically activate appropriate display modes for HUD 30 and for PFD 14A and also activate one or more monitors 48 required to benefit from the operational credit. Such actions resulting from a single selection by the flight crew can facilitate the activation of vision guidance system and alleviate flight crew workload. For example, selection of the SVGS operating mode via selectable object 68B can automatically and by default cause HUD 30 and PFD 14A to simultaneously display a synchronized image that includes SV without EV and activate one or more monitors 48 required to benefit from operational credit. Similarly, selection of the CVGS operating mode via selectable object 68C can automatically and by default cause HUD 30 and PFD 14A to simultaneously display a synchronized image that includes a combination of SV and EV and activate one or more monitors 48 required to benefit from operational credit.

Despite the default display modes of HUD 30 and PFD 14A that are automatically commanded via line select key 66A, the flight crew may subsequently override the default display mode of PFD 14A via line select key 66B. The selection of a display mode for PFD 14A via line select key 66B may not affect the display mode of HUD 30. Repeated actuation (e.g., depressing) of line select key 66B can serve to toggle between an OFF, SVS and CVS display modes of PFD 14A. Selectable object 70A labeled "OFF" can represent a display mode where no SV and no EV is provided on PFD 14A. Selectable object 70B labeled "SVS" is intended to represent a display mode where SV is provided without EV. Selectable object 70C labeled "CVS" is intended to represent a display mode where a combination of SV and EV is provided. The applicable selectable object 70A, 70B or 70C that corresponds to the active/selected display mode provided on PFD 14A can be visually distinct from the inactive display modes by way of being of a different color, underlined or otherwise visually distinguished. FIG. 9 shows selectable object 70A as being currently active by way of being of a different color than selectable objects 70B and 70C.

FIGS. 10A-10D are schematic representations of HUD 30 and HDD 14 (e.g., PFD 14A) under different display modes selected via controller 26 and/or via HUD mode selector 32. FIG. 10A shows an example where a SVGS operating mode of vision guidance system 34 has been selected via line select key 66A and the default display mode (SV image) for HUD 30 and HDD 14 have been retained. Accordingly, both HUD 30 and HDD 14 show a SV image and annunciations 56 indicate a SVS display mode and a SVGS operating mode of vision guidance system 34. In this operating mode, the flight crew may achieve a lower-than-standard DH or DA due at least in part to the use of vision guidance system 34 which provides additional monitoring required to benefit from the operational credit.

FIG. 10B shows an example where a CVGS operating mode of vision guidance system 34 has been selected via line select key 66A and the default display mode (CV image) for HUD 30 and HDD 14 has been retained. Accordingly, both HUD 30 and HDD 14 show a CV image and annunciations 56 indicate a CVS display mode and a CVGS operating mode of vision guidance system 34. In this operating mode, the flight crew may achieve a lower a DH or DA due at least in part to the use of vision guidance system 34 which provides additional system/performance monitoring required to benefit from the operational credit. Once the decision height/altitude has been reached, the combination of SV and EV, together with additional system/performance monitoring, can be used to reduce the occurrence of a missed approach (e.g., go around), by allowing the SV to be validated against the EV and by providing the required visual reference(s) (such as the runway markings or runway environment) and help with monitoring the safety of the approach and landing operation to the flight crew through the EV contribution to the CV image. For example the reliance on SV and/or EV to provide the required visual reference(s), together with system/performance monitoring, can potentially permit landing and rollout to a safe taxi speed at a lower runway visual range (RVR) value which correspond to the distance over which a pilot of an aircraft on the centreline of the runway can see the runway surface markings delineating the runway or identifying its centre line.

FIG. 10C shows an example where the EVO operating mode of vision guidance system 34 has been set to OFF via line select key 66A but that an EVS display mode has been selected for HUD 30 via HUD mode selector 32 (see FIG. 8). MFD 14B can also be set to the EVS display mode via HUD mode selector 32 or via some other input device. Accordingly, both HUD 30 and MFD 14B show an EV image and annunciations 56 indicate an EVS display mode only. In this operating mode, the flight crew's situational awareness can be improved through the use of EV, but this operating mode may not provide monitoring functions that provide an operational advantage that expands the operational capabilities of aircraft 10.

FIG. 10D shows an example where the CVGS operating mode of vision guidance system 34 has been selected via line select key 66A and the default CVS display mode (CV image) is active for HUD 30 however the display mode for PFD 14A has been manually overridden by the flight crew from the default CVS display mode to the SVS display mode (SV image) via line key 66B. Accordingly, annunciation 56 displayed on HUD 30 indicates a CVS display mode and a CVGS operating mode of vision guidance system 34, and annunciation 56 displayed on PFD 14A indicates a SVS display mode and the same CVGS operating mode of vision guidance system 34. In this operating mode, the same operational advantage as in the situation of FIG. 10B can be achieved but the flight crew has exercised the option of overriding the default display mode of PFD 14A by selecting selectable object 70B via line select key 66B for example. Other combinations of display modes and operating modes are possible.

Figures 11, 12:
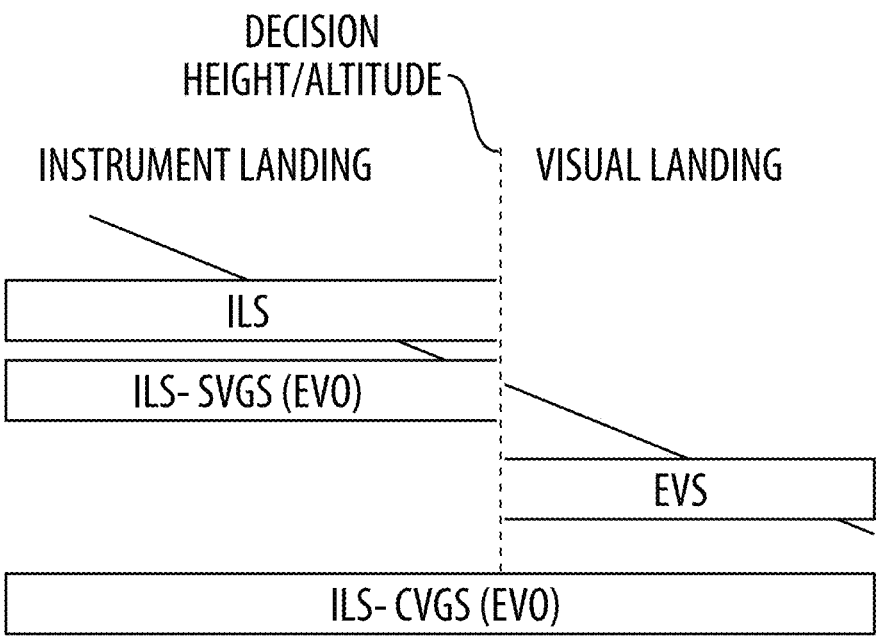
FIG. 11 is a schematic representation of a transition from instrument landing to visual landing during landing of an aircraft.
FIG. 12 is a flow diagram of an exemplary method for operating a combined vision guidance operating mode of a vision guidance system of an aircraft.

FIG. 11 is a schematic representation of a transition from instrument landing to visual landing during an aircraft landing procedure. A typical instrument landing system (ILS) can allow an aircraft to reach a standard DH or DA. The CVGS and SVGS operating modes can be subtypes of instrument landing methods. The CVGS operating mode makes use of the SVGS operating mode that aims to bring the DH or DA to a lower-than-standard value by providing system/performance monitoring that enables an operational credit of being able to reduce the DH or DA. Once the desired DH or DA is reached, the CVGS operating mode makes use of EV to provide the visual reference required by the flight crew for landing.

FIG. 12 is a flow diagram of an exemplary method 100 for activating a combined vision guidance (e.g., CVGS) operating mode of vision guidance system 34 of an aircraft. Method 100 can be performed using vision guidance system 34 described herein or using other systems. For example, machine-readable instructions 42 can be configured to cause computer 36 to perform at least part of method 100. It is understood that aspects of method 100 can be combined with aspects of other methods described herein. In various embodiments, method 100 can comprise causing simultaneous display of first selectable object 68C and second selectable object 68B (see FIG. 9) in display area 62 of a display device (e.g., of multifunction controller 26) (e.g., see block 102). First selectable object 68C can be associated with the activation of the CVGS operating mode and second selectable object 68B can be associated with an activation of the SVGS operating mode of vision guidance system 34. The CVGS operating mode can include use of a combination of SV and EV. The SVGS can include the use of SV without EV. Method 100 can comprise receiving an input indicative of a selection of first selectable object 68C associated with the CVGS operating mode (e.g., see block 104); and, after receiving the input, (e.g., automatically) activating the CVGS operating mode of vision guidance system 34 (e.g., see block 106).

Method 100 can comprise automatically activating one or more monitors 48 upon activation of the CVGS operating mode. Method 100 can comprise monitoring a deviation of a position of aircraft 10 from a desired flight path (e.g., FTE) of aircraft 10 when the CVGS operating mode is active. In reference to FIG. 9, the input can be received in response to one or more actuations of line select key 66A. Activating the CVGS operating mode can comprises automatically causing HUD 30 and/or HDD 14 to display an image comprising the combination of SV and EV (e.g., see FIG. 7) and activating monitors 48 that monitor the safety of the approach and landing.

Figure 13A:
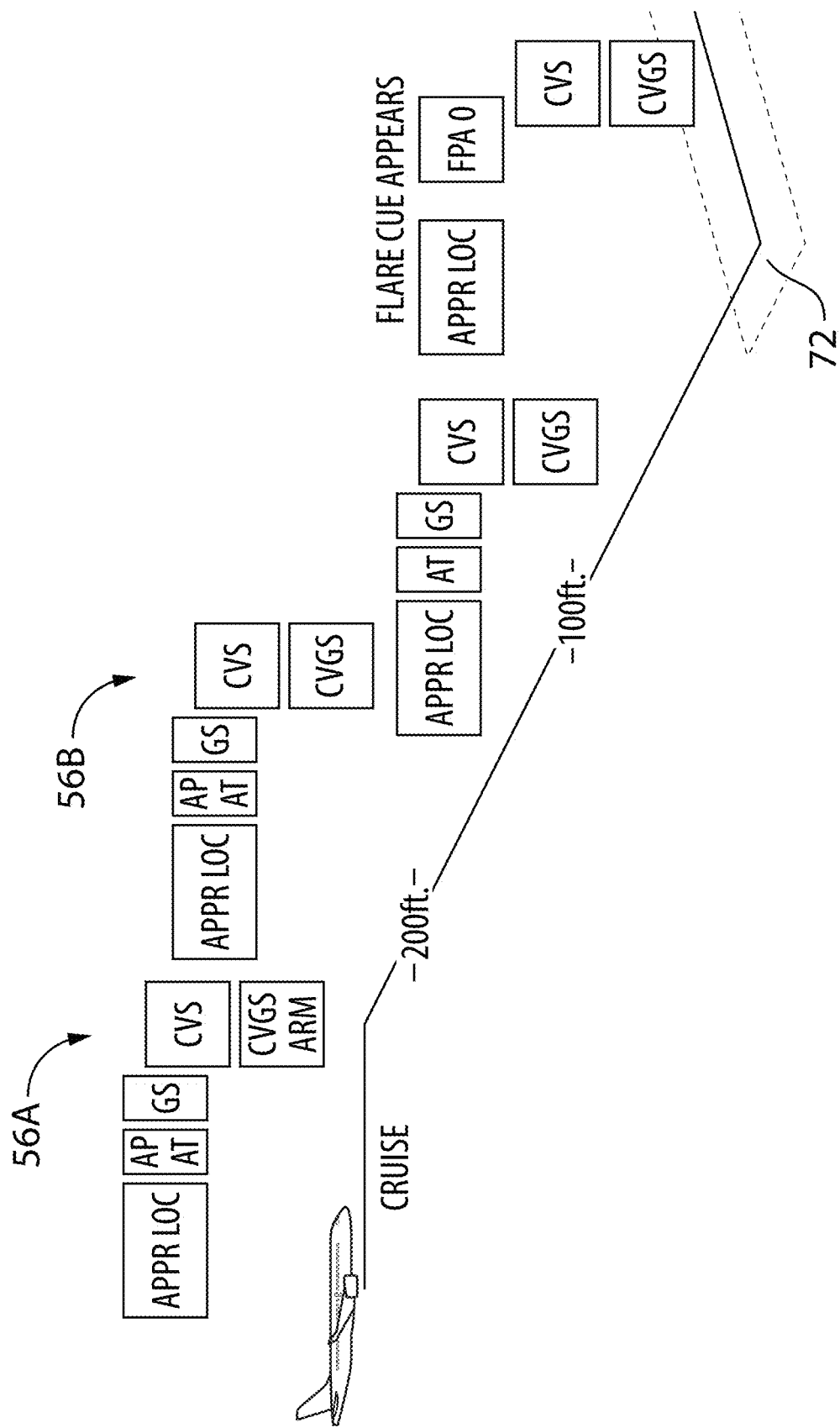
FIG. 13A is a schematic representation of a flight path of an aircraft from a cruise phase of flight to landing of the aircraft.

FIG. 13A is a schematic representation of a flight path of aircraft 10 from a cruise phase of flight to landing on runway 72. FIG. 13A illustrates an exemplary utilisation of vision guidance system 34 and illustrates steps that can be part of method 100 or other methods described herein. For example, after receiving the input, method 100 can comprise arming the CVGS or SVGS operating mode before activating the CVGS or SVGS operating mode. Arming the CVGS or SVGS operating mode can be done ahead of aircraft 10 meeting a predetermined expected threshold condition at which the CVGS or SVGS operating mode is desired or required. Such threshold condition can comprise reaching a threshold altitude (e.g., 2,500 ft or about 762 m) during an approach phase of flight of aircraft 10. Alternatively or in addition, such threshold condition can comprise reaching a threshold distance (e.g., 31 nautical miles) of aircraft 10 from the runway 72 on which aircraft 10 is to land. Arming of the CVGS or SVGS operating mode may allow the pilot to know whether he/she can proceed to safely fly a CVGS or SVGS approach operation prior to the CVGS or SVGS operating mode being activated. The arming may also allow the capability of one or more systems of aircraft 10 to be assessed ahead of time.

Arming of the CVGS or SVGS operating mode can be conditional upon certain conditions being met. For example, arming of the CVGS or SVGS operating mode can comprise performing one or more aircraft systems checks to ensure that all systems required for conducting the CVGS or SVGS approach and landing are available and operating to the required level of performance. Such system checks can be performed by one or more of monitors 48, by the flight crew and/or other devices of aircraft 10. In some embodiments, arming of the CVGS or SVGS operating mode can be conducted automatically by vision guidance system 34 after receiving the input but before activating the CVGS or SVGS operating mode. Arming of the CVGS or SVGS operating mode can be annunciated on HUD 30 and/or on HDD 14. Then, (e.g., automatic) activation of the CVGS or SVGS operating mode can also be annunciated on HUD 30 and/or on HDD 14 at the appropriate time. FIG. 13A shows exemplary annunciations 56A, 56B associated with arming and activating the CVGS operating mode respectively. Annunciations 56A and 56B can be provided on HUD 30 and/or on HDD 14. Annunciation 56A indicates a CVS display mode that is currently active and an armed CVGS operating mode. Then, at a lower altitude and/or at a shorter distance from runway 72, annunciation 56B indicates the same CVS display mode being active and the CVGS operating mode also being active.

Figure 13B:
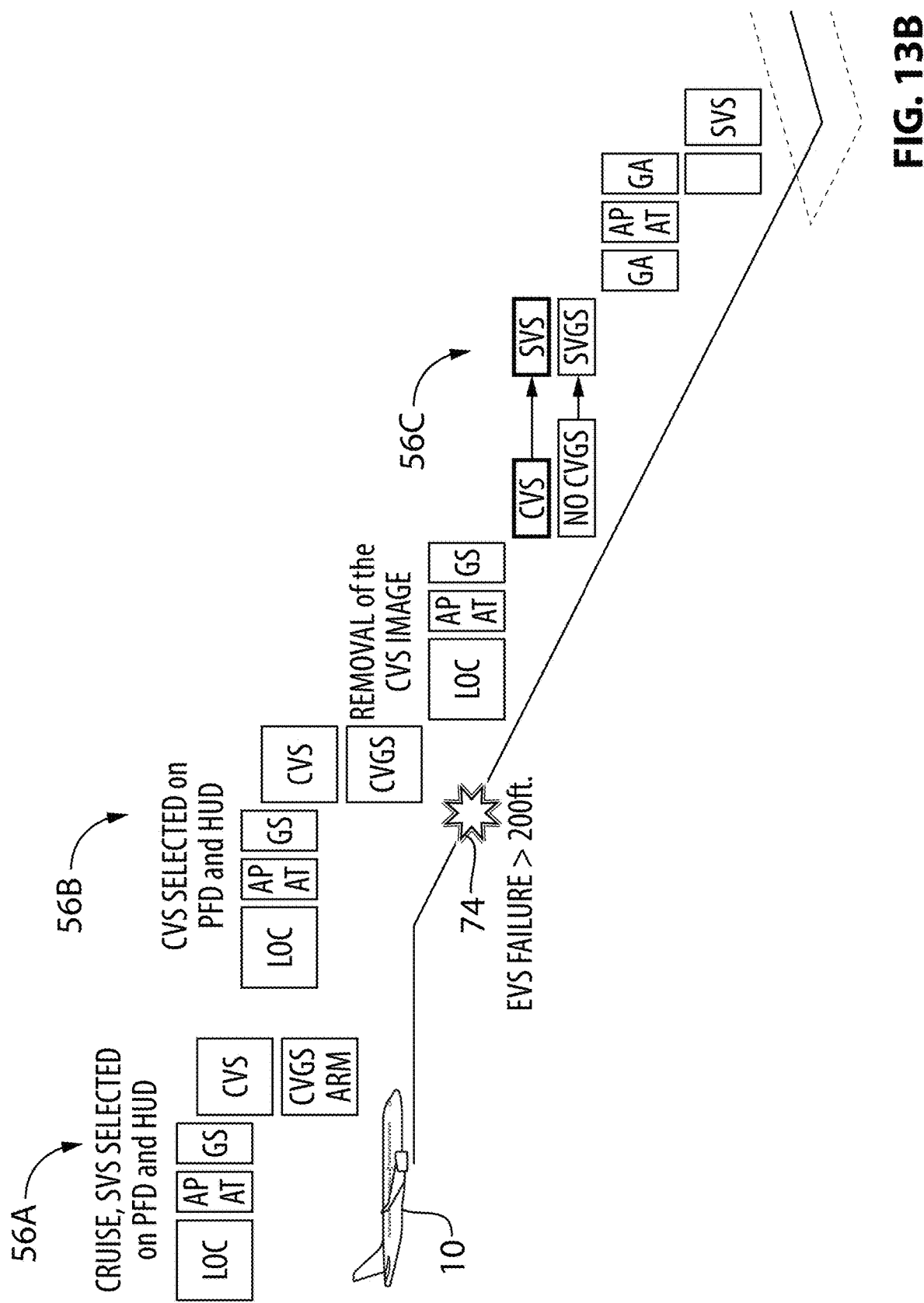
FIG. 13B is another schematic representation of the flight path of an aircraft from a cruise phase of flight to landing during which a failure of an enhanced vision system occurs.

Annunciating the arming and activation of the CVGS or SVGS operating mode can comprises displaying different indications (e.g., graphics, words, etc.) to distinguish the two armed and active states. Alternatively, in some embodiments, annunciating the arming and activation of the CVGS or SVGS operating mode can comprise displaying the same indication but in different colors to distinguish the two states. For example, the indication "CVGS" shown in white or cyan can represent an armed state and the same indication shown in green can represent an active state. FIG. 13B is a schematic representation of a flight path of an aircraft from a cruise phase of flight to landing, in which an EVS failure occurs at point 74. An exemplary scenario would be that the flight crew selects the CVS display mode and the CVGS operating mode when the aircraft begins its descent. The arming of the CVGS operating mode would be properly annunciated on HUD 30 and/or PFD 14A via indication 56A. When the appropriate threshold condition(s) is/are met, the CVGS operating mode would be (e.g., automatically) activated and such activation would be annunciated via annunciation 56B.

Since the CVGS operating mode is based on the SVGS operating mode, when the EVS failure occurs, the CVGS operating mode can automatically change to the SVGS operating mode. As a result, the flight crew would recognize that a form of system degradation has occurred when the display mode automatically changes to SVS instead of the commanded CVS display mode, and also that the operating mode changes to SVGS instead of the commanded CVGS operating mode. The automated change can provide a graceful degradation if EVS 46 fails. The automated change can be annunciated on HUD 30 and/or on HDD 14 via annunciation 56C.

In some embodiments, EVS failure 74 can be detected by monitor(s) 48 of vision guidance system 34 by detecting that no power is supplied to EVS 46 and/or via suitable fault detection. EVS failure 74 can also be detected by the flight crew when no EV is provided on HUD 30 and/or HDD 14, or via annunciation 56C.

FIG. 14A illustrates truth table 76 that may be used by vision guidance system 34 to determine a status of and arm the SVGS or the CVGS, and also determine suitable annunciation(s) 56 based on the determination. Truth table 76 may be populated with one or more input conditions (e.g., conditions A-G) with associated values such as "Y" indicating YES, "N" indicating NO and "X" indicating either YES "Y" or NO "N". The conditions and values in truth table 76 may be used to perform logic operations by vision guidance system 34 and cause the appropriate annunciation(s) to be generated.

FIG. 14B illustrates definition table 78 with exemplary conditions A-F that may be used in truth table 76. It is understood that conditions A-F are listed here as examples only and that truth table 76 may include different conditions than those defined herein.

Condition A: (SVGS or CVGS approach has been selected (e.g., via controller 26 in FIG. 9)) AND (a radio altitude minimum (e.g., decision height) is set into a radio altitude monitor of aircraft 10 and is valid) AND (SV image or CV image displayed) AND (the aircraft is within 31 nautical miles of the destination airport or runway).

Condition B: (Active lateral mode is "APPR LOC" where the aircraft is within the horizontal guidance of an instrument landing system localizer along an axis of the destination airport or runway) AND (Radio altitude is valid).

Condition C: the SVS display mode or the CVS display mode has failed.

Condition D: (SVS obstacle database has failed OR SVS airport/runway database has failed) OR SVS database has expired).

Condition E: a global navigation satellite system (GNSS) of the aircraft is in a satellite-based augmentation system (SBAS) mode of operation.

Condition F: One or more (e.g., high-performance) system monitors 48 have not failed. Such monitors 48 can include a navigation system error monitor and a SVGS scene positioning error monitor that are intended to operate during the SVGS or CVGS approach. For example, system monitors 48 can verify that applicable systems associated with the execution of the SVGS or CVGS approach meet the minimum aviation system performance standards (MASPS) for synthetic vision guidance systems as defined in Radio Technical Commission for Aeronautics (RTCA) document No. DO-359.

Figure 15:
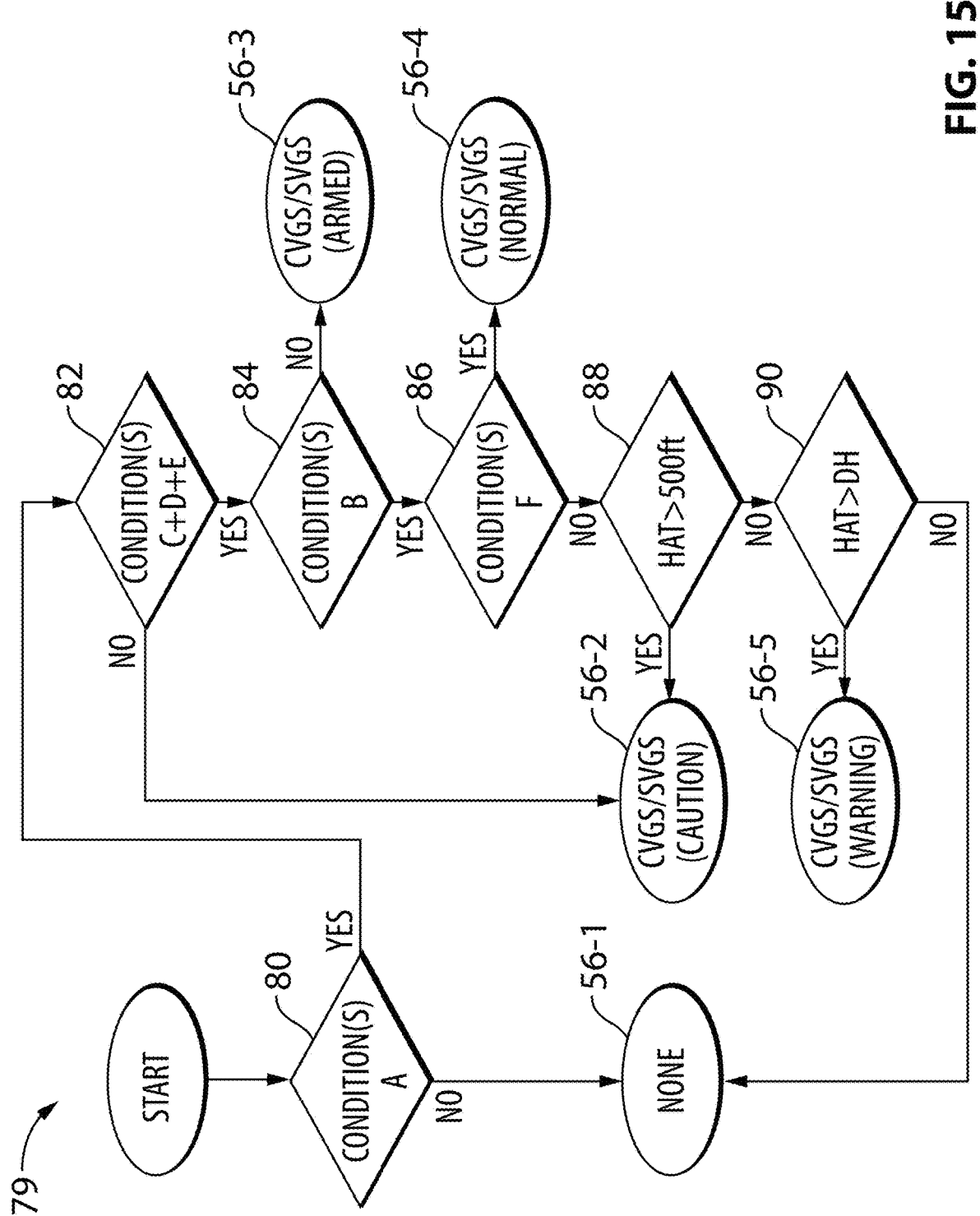
FIG. 15 illustrates a flow diagram of an exemplary algorithm for implementing a state machine for use by the vision guidance system of FIG. 2.

FIG. 15 illustrates a flow diagram of an algorithm 79 that can be implemented as a (e.g., software type) state machine in vision guidance system 34 (e.g., via instructions 42) for determining when the SVGS or CVGS should be armed and also what type of annunciation 56-1 to 56-5 may be displayed based on the status of the SVGS or CVGS.

The color of the font used for annunciation 56 may be used to indicate the status of the CVGS or SVGS. A white font or cyan font may indicate that the CVGS or SVGS is armed. For example, when the CVGS or SVGS is armed, the indication "CVGS ARM" or "SVGS ARM" may be displayed on HUD 30 and the indication "CVGS" or "SVGS" may be displayed on PFD 14A using a white font or cyan font. A green font may indicate that the CVGS or SVGS is active and operating normally. For example, when the CVGS or SVGS is active, the indication "CVGS" or "SVGS" may be displayed on HUD 30 and the indication "CVGS" or "SVGS" may be displayed on PFD 14A using a green font.

If vision guidance system 34 determines that the operational state(s) of aircraft system(s) do not meet the required criteria to enable the utilization of the SVGS or the CVGS, an indication indicating that the SVGS or the CVGS is not armed or has failed may be provided. For example, an amber font (indicating caution) or a red font (indicating a warning) may indicate that the CVGS or SVGS cannot be armed or has failed. For example, when the CVGS or SVGS is determined to have failed and aircraft 10 has a height above touchdown (HAT) greater than 500 ft (152 m), an unboxed indication "NO SVGS" or "NO CVGS" may be displayed on HUD 30 and the indication "SVGS" or "CVGS" may be displayed on PFD 14A using an amber font. In addition, a message "SVGS INVALID (C)" or "CVGS INVALID (C)" may be presented in a crew alerting system (CAS) of aircraft 10. When the CVGS or SVGS is determined to have failed and aircraft 10 has a HAT between 500 ft and the lower-than-standard decision height, a boxed indication "NO SVGS" or "NO CVGS" may be displayed on HUD 30 and the indication "SVGS" or "CVGS" may be displayed on PFD 14A using a red font. In addition, a message "SVGS INVALID (C)" or "CVGS INVALID (C)" may optionally be presented in a crew alerting system (CAS) of aircraft 10. An aural indication may also be used to alert the flight crew. The HAT may be monitored by a system monitor(s) 48 that may be implemented by combining an error monitor of a navigation system of aircraft 10 and a scene position source monitor of SVS 44.

Decision blocks 80, 82, 84, 86 and 90 make reference to conditions A-F defined in FIG. 14B and above. At decision block 80, condition A may be evaluated. If condition A is not met (see "No"), algorithm 79 may proceed to producing a null/blank annunciation 56-1 associated with SVGS or CVGS because the SVGS or CVGS approach mode has not been selected by the pilot or the position of aircraft 10 is not within the range that allows arming of the SVGS or CVGS for example. However, if condition A is met (see "Yes"), algorithm 79 may proceed to decision block 82.

At decision block 82, conditions C, D and E may be evaluated. If conditions C, D and E are not all met (see "No"), algorithm 79 may proceed to producing annunciation 56-2 such as "SVGS" or "CVGS" on PFD 14A using an amber font (caution) because the SVGS or CVGS cannot be armed and cannot be activated due to a system failure for example. However, if conditions C, D and E are all met (see "Yes"), algorithm 79 may proceed to decision block 84.

At decision block 84, condition B may be evaluated. Condition B may be indicative of the aircraft 10 being within the horizontal guidance of an instrument landing system localizer along the axis of the destination airport or runway and the radio altitude being valid. If condition B is not met (see "No") algorithm 79 may proceed to producing annunciation 56-3 indicating that the SVGS or the CVGS is armed. Such annunciation 56-3 may include the indication "SVGS" or "CVGS" on PFD 14A using a white font or cyan font. However, once condition B is met (see "Yes"), algorithm 79 may proceed to decision block 86.

At decision block 86, condition F may be evaluated. If condition F is met (see "Yes"), algorithm 79 may proceed to producing annunciation 56-4 indicating that the SVGS or the CVGS is active and operating normally. Such annunciation 56-4 may include the indication "SVGS" or "CVGS" on PFD 14A using a green font. However, if condition F is not met (see "No"), algorithm 79 may proceed to decision block 88.

At decision block 88, the HAT is compared to a first prescribed threshold such as 500 ft for example. If the HAT is greater than the first prescribed threshold (see "Yes"), algorithm 79 may proceed to producing annunciation 56-2 as described above. The "caution" type of indication may be indicative of the pilot not being authorized to continue with the landing of aircraft 10 using SVGS or CVGS and should be ready to execute an appropriate action such as a go-around. Once the HAT is no longer greater than the first prescribed threshold (see "No"), algorithm 79 may proceed to decision block 90.

At decision block 90, the HAT is compared to a second prescribed threshold such as the lower-than-standard decision height indicated as DH in FIG. 15. If the HAT is greater than the second prescribed threshold (see "Yes"), algorithm 79 may proceed to producing annunciation 56-5 such as "SVGS" or "CVGS" on PFD 14A using a red font (warning) because the SVGS or CVGS cannot safely be activated due to a system failure for example. The "warning" type of indication may be indicative of the pilot not being authorized to continue with the landing of aircraft 10 using SVGS or CVGS and must perform a go-around immediately. The first prescribed threshold altitude may serve as a transition point where the annunciation produced by algorithm 79 switches from caution (amber) to warning (red).

It is understood that annunciations 56-2 to 56-5 may include indications on PFD 14A and/or indications on HUD 30 as explained above in relation to truth table 76. Alternatively or in addition, annunciations 56-2 to 56-5 may include aural indications.

Algorithm 79 or part(s) thereof may be executed repeatedly (e.g., intermittently of continuously) once initiated in order to provide up-to-date annunciations 56-1 to 56-5 based on the substantially real-time status of applicable aircraft systems.

Figure 16C:
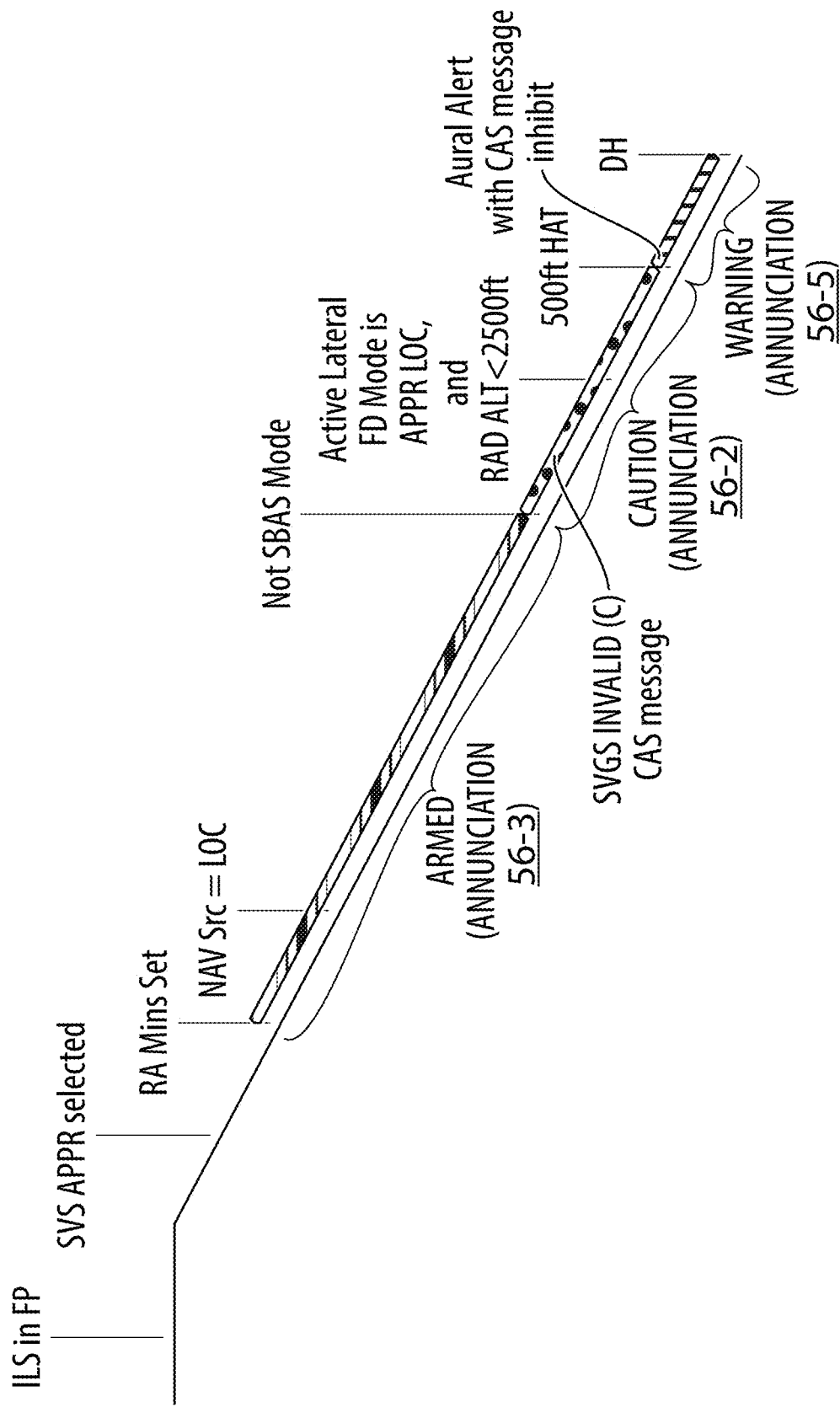

FIGS. 16A-16D show a schematic representation of a flight path of aircraft 10 from a cruise phase of flight to a HAT of the lower-than-standard decision height (indicated as "DH") with exemplary locations along the flight path where annunciations 56-2, 56-3, 56-4 and 56-5 of FIG. 15 may be provided. FIG. 16A illustrates a normal operation of SVGS or CVGS where SVGS or CVGS may first be armed at a radio altitude above 2,500 ft for example as shown by armed annunciation 56-3, and then become active at an altitude of 2,500 ft as shown by active annunciation 56-4.

FIG. 16B illustrates a situation where condition E (GNSS in SBAS mode) at block 82 of FIG. 15 is not met (see "No") at a time before arming of the SVGS or the CVGS would be performed. Accordingly, instead of providing armed annunciation 56-3, caution annunciation 56-2 may be provided until a HAT of 500 ft and then warning annunciation 56-5 may subsequently be provided.

FIG. 16C illustrates a situation where condition E (GNSS in SBAS mode) at block 82 of FIG. 15 becomes not met (see "No") at a time during the armed phase of the SVGS or the CVGS. Accordingly, armed annunciation 56-3 provided during an initial armed phase may be replaced by caution annunciation 56-2 and provided until a HAT of 500 ft and then warning annunciation 56-5 may subsequently be provided.

Figure 16D:
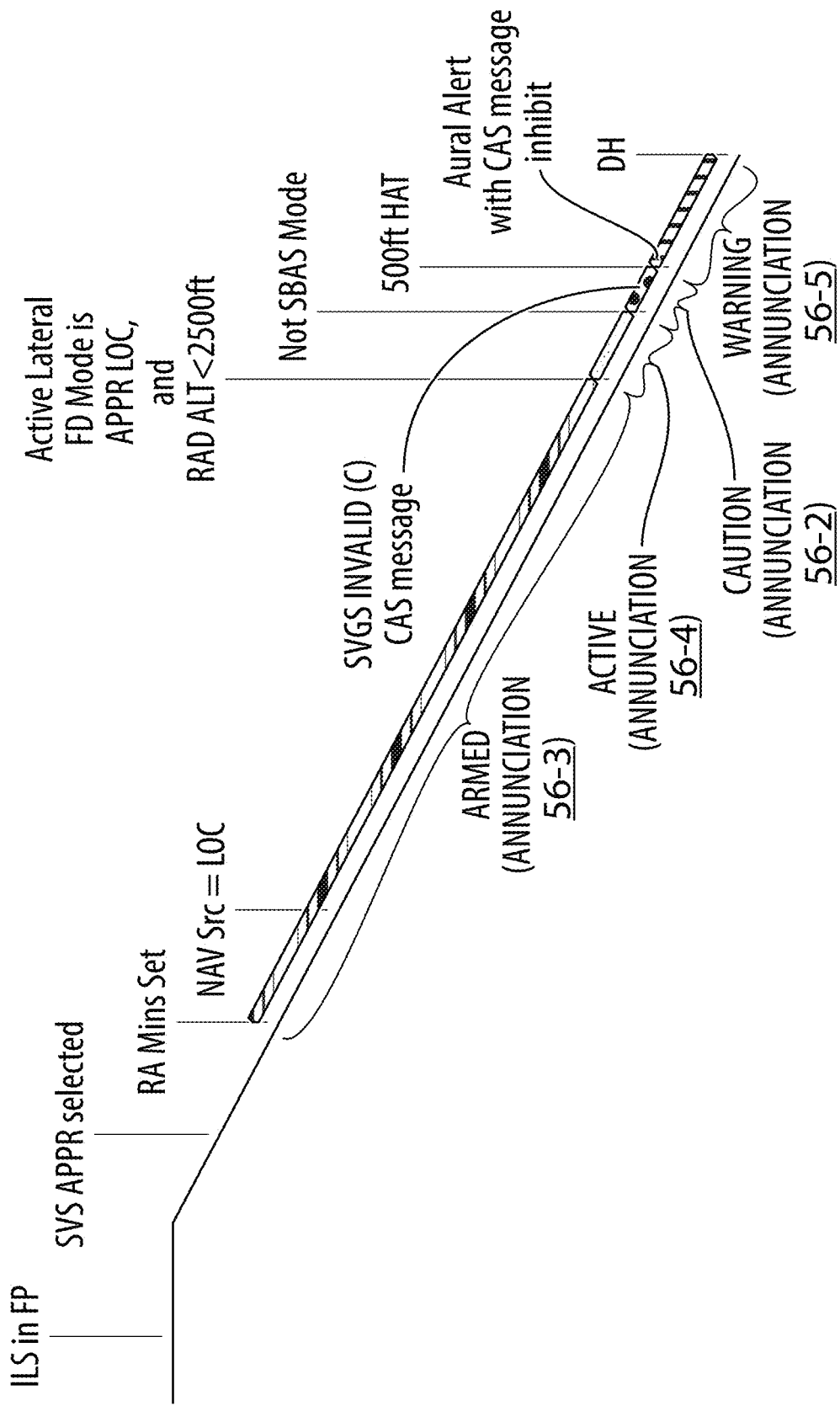

FIG. 16D illustrates a situation where condition E (GNSS in SBAS mode) at block 82 of FIG. 15 becomes not met (see "No") at a time during the active phase of the SVGS or the CVGS. Accordingly, armed annunciation 56-3 may be provided during the armed phase at a radio altitude above 2,500 ft for example, and then active annunciation 56-4 may be provided at a radio altitude of 2,500 ft. Once condition E becomes not met, active annunciation 56-4 may be replaced by caution annunciation 56-2 which may be provided until a HAT of 500 ft and then warning annunciation 56-5 may subsequently be provided.

FIGS. 16B-16D illustrate the effect of condition E not being met but it is understood that the same or similar effect could be provided for one or more conditions including those described herein or other conditions. Algorithm 79 or other similar algorithms can be used to assess the capabilities of the SVGS and/or the CVGS at appropriate time(s) to provide suitable annunciations to the pilot and ensure that the SVGS and the CVGS can safely be used to obtain an operational credit. In some embodiments, algorithm 79 may be executed repeatedly or continuously during the armed and active phases of SVGS or CVGS in order to provide suitable monitoring of the capabilities of the SVGS and/or the CVGS and appropriate annunciation(s).

FIG. 17 is a flow diagram of another exemplary method 200 for activating the CVGS operating mode of a vision guidance system of an aircraft. Method 200 can be performed using vision guidance system 34 described herein or using other systems. For example, machine-readable instructions 42 can be configured to cause computer 36 to perform at least part of method 200. It is understood that aspects of method 200 can be combined with aspects of other methods described herein. In various embodiments, method 200 can comprise: receiving a first user input indicative of a desired activation of the CVGS operating mode combining SV and EV (see block 202); and after receiving the first user input, activating the CVGS operating mode in an absence of a second user input (e.g., received before or after the first user input) indicative of a desired display mode of one or more display devices of aircraft 10 (see block 204). The activation of the CVGS operating mode can comprise automatically activating the desired display mode of the one or more display devices.

As explained above in relation to FIG. 9, the selection of the CVGS operating mode (e.g., selectable object 68B) via line select key 66A of multifunction controller 26 can also cause an automatic arming and/or activation of the default CVS display mode that is associated with the CVGS operating mode. Accordingly, in order to alleviate pilot workload, no additional or separate user input/step is needed to activate the CVS display mode when the CVGS operating mode is commanded via line select key 66A. For example the SVS display mode or the SVGS operating mode do not have to be activated before activating the CVGS operating mode.

FIG. 18 is a flow diagram of an exemplary method 300 for operating a vision guidance system of an aircraft. Method 300 can be performed using vision guidance system 34 described herein or using other systems. For example, machine-readable instructions 42 can be configured to cause computer 36 to perform at least part of method 300. It is understood that aspects of method 300 can be combined with aspects of other methods described herein. Method 300 is described below in reference to FIG. 13B. In various embodiments, method 300 can comprise: operating vision guidance system 34 of aircraft 10 in the CVGS operating mode including a combination of SV and EV (see block 302); determining that EV has failed (e.g., see point 74 in FIG. 13B) or is otherwise unavailable (see block 304); and upon determining that EV is unavailable, automatically deactivating the CVGS operating mode and activating the SVGS operating mode including the use of SV without EV (see block 306).

Upon activating the SVGS operating mode, method 300 can comprise annunciating the activation of the SVGS operating mode on HUD 30 and/or on HDD 14 via annunciation 56C (see FIG. 13B) for example. Activating the SVGS operating mode can comprises causing HUD 30 and/or HDD 14 to display an image comprising SV without EV.

FIG. 19 is a flow diagram of an exemplary method 400 for operating a vision guidance system of an aircraft. Method 400 can be performed using vision guidance system 34 described herein or using other systems. For example, machine-readable instructions 42 can be configured to cause computer 36 to perform at least part of method 400. It is understood that aspects of method 400 can be combined with aspects of other methods described herein. Method 400 is described below in reference to FIGS. 13A to 16D. In various embodiments, method 400 can comprise: receiving an input indicative of a desired activation of the SVGS or CVGS operating mode of vision guidance system 34 where the input is received before aircraft 10 has reached a threshold condition permitting activation of the SVGS or CVGS operating mode (see block 402); arming the SVGS or CVGS operating mode (see block 404); and when aircraft 10 has reached the threshold condition, (e.g., automatically) activating the SVGS or CVGS operating mode (see block 406). The SVGS operating mode may include use of SV without EV. The CVGS operating mode may include use of a combination of SV and EV. The arming and activation of the SVGS or CVGS operating mode can be annunciated via HUD 30 and/or HDD 14 using annunciations 56A and 56B shown in FIGS. 13A and 13B and/or using annunciations 56-2 to 56-5 of FIG. 15.

FIG. 20 is a flow diagram of an exemplary method 500 for operating a vision guidance system of an aircraft. Method 500 can be performed using vision guidance system 34 described herein or using other systems. For example, machine-readable instructions 42 can be configured to cause computer 36 to perform at least part of method 500. It is understood that aspects of method 500 can be combined with aspects of other methods described herein. Method 500 is described below in reference to FIG. 9. In various embodiments, method 500 can comprise: receiving an input via multifunction controller 26 disposed in glare shield panel 28 of aircraft 10 where the input is indicative of a desired activation of the CVGS operating mode of vision guidance system 34 (see block 502); and activating the CVGS operating mode (see block 504) where the CVGS operating mode includes use of a combination of SV and EV.

The input can be a first input and method 500 can comprise: receiving a second input via multifunction controller 26 where the second input is indicative of a desired change in display mode of HDD 14 of flight deck 12 of aircraft 10; and executing the change in display mode of HDD 14. The change in display mode can be a transition to an image comprising synthetic vision (e.g., see selectable objects 70B and 70C in FIG. 9). The change in display mode can be a transition to an image comprising a combination of SV and EV (e.g., see selectable object 70C in FIG. 9). The change in display mode can be a transition to an image that excludes SV and EV (e.g., see selectable object 70A in FIG. 9).

Figure 21:
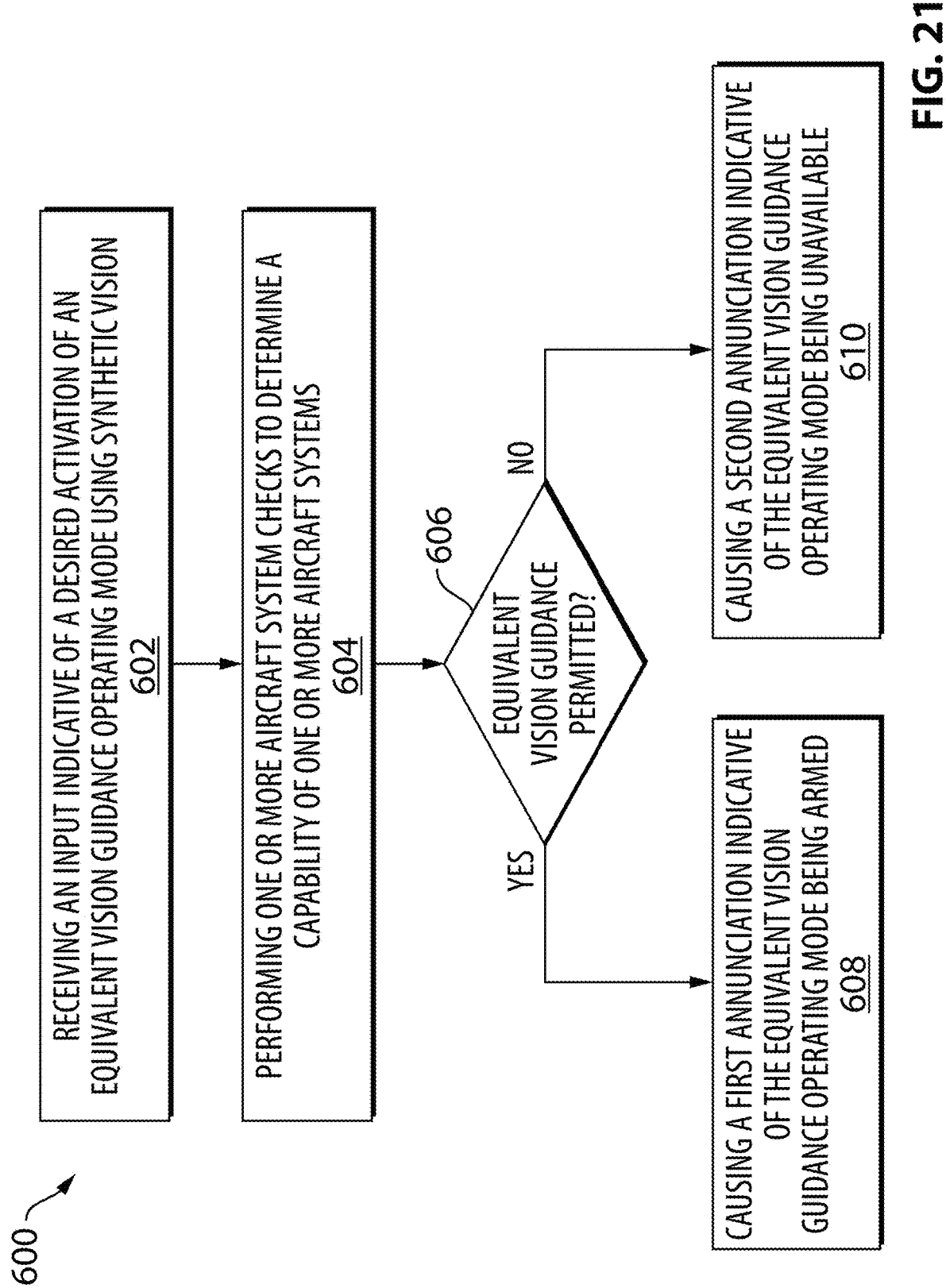
FIG. 21 is a flow diagram of a further exemplary method for operating a vision guidance system of an aircraft.

FIG. 21 is a flow diagram of an exemplary method 600 for operating a vision guidance system of an aircraft. Method 600 can be performed using vision guidance system 34 described herein or using other systems. For example, machine-readable instructions 42 (e.g., based on algorithm 79 in FIG. 15) can be configured to cause computer 36 to perform at least part of method 600. It is understood that aspects of method 600 can be combined with aspects of other methods described herein. In various embodiments, method 600 may comprise:

receiving an input (e.g., via multifunction controller 26) indicative of a desired activation of an equivalent vision guidance (e.g., SVGS or CGVS) operating mode using synthetic vision (see block 602), the input being received before aircraft 10 has reached a threshold condition (e.g., within 31 NM of the destination) permitting activation of the equivalent vision guidance operating mode;

performing one or more aircraft system checks to determine a capability of one or more aircraft systems (see block 604);

when the capability of the one or more aircraft systems permits the use of the equivalent vision guidance operating mode (see "Yes" at decision block 606), causing a first annunciation (e.g., armed annunciation 56-3 in FIG. 16C) indicative of the equivalent vision guidance operating mode being armed (see block 608); and when the capability of the one or more aircraft systems prevents the use of the equivalent vision guidance operating mode (see "No" at decision block 606), causing a second annunciation (e.g., caution annunciation 56-2 in FIG. 16C) indicative of the equivalent vision guidance operating mode being unavailable (see block 610).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A vision guidance system of an aircraft, the system comprising:
a synthetic vision system;
an enhanced vision system;
a display device defining a display area;
one or more data processors operatively coupled to the display device, to the synthetic vision system and to the enhanced vision system; and
non-transitory machine-readable memory operatively coupled to the one or more data processors and storing instructions executable by the one or more processors and configured to cause the one or more processors to:
cause simultaneous display of a first selectable object and of a second selectable object in the display area of the display device, the first selectable object being associated with an activation of a combined vision guidance operating mode of the vision guidance system and the second selectable object being associated with an activation of a synthetic vision guidance operating mode of the vision guidance system, the combined vision guidance operating mode including use of a combination of synthetic vision and enhanced vision, and the synthetic vision guidance operating mode including use of synthetic vision without enhanced vision; and after a selection of the first selectable object associated with the combined vision guidance operating mode, cause an activation of the combined vision guidance operating mode;

wherein the instructions are also configured to cause the one or more processors to:

while the combined vision guidance operating mode is active, determine that an enhanced vision system of the aircraft is unavailable; then cause automatic deactivation of the combined vision guidance operating mode; and cause automatic activation of the synthetic vision guidance operating mode.

2. The system as defined in claim 1, wherein the display device is part of a multifunction controller disposed in a glare shield panel of the aircraft.

3. The system as defined in claim 1, wherein the instructions are configured to cause the one or more processors to, after the selection of the first selectable object, cause arming of the combined vision guidance operating mode before activating the combined vision guidance operating mode.

4. The system as defined in claim 1, wherein causing the activation of the combined vision guidance operating mode comprises automatically causing a head-up display device of a flight deck of the aircraft to display an image comprising the combination of synthetic vision and enhanced vision.

5. The system as defined in claim 1, wherein causing the activation of the combined vision guidance operating mode comprises automatically causing a head-down display device of a flight deck of the aircraft to display an image comprising the combination of synthetic vision and enhanced vision.

6. The system as defined in claim 1, wherein causing the activation of the combined vision guidance operating mode comprises automatically causing a head-down display device and a head-up display device of a flight deck of the aircraft to each display an image comprising the combination of synthetic vision and enhanced vision.

7. The system as defined in claim 6, wherein the instructions are configured to cause the one or more processors to:

after the selection of the first selectable object, cause automatic arming of the combined vision guidance operating mode before causing activation of the combined vision guidance operating mode;

cause annunciation of the arming of the combined vision guidance operating mode on the head-up display device and on the head-down display device; and upon causing the activation of the combined vision guidance operating mode, cause the annunciation of the activation of the combined vision guidance operating mode on the head-up display device and on the head-down display device.

8. The system as defined in claim 7, wherein:

causing annunciation of the arming of the combined vision guidance operating mode comprises causing an indication to be displayed in a first color on the head-up display device and on the head-down display device; and causing annunciation of the activation of the combined vision guidance operating mode comprises causing the indication to be displayed in a second color different from the first color on the head-up display device and on the head-down display device.

9. The system as defined in claim 7, wherein the instructions are configured to cause the one or more processors to cause activation of the combined vision guidance operating mode after a threshold condition has been met.

10. The system as defined in claim 9, wherein the threshold condition comprises an altitude of the aircraft.

11. The system as defined in claim 10, wherein the threshold condition comprises a distance of the aircraft from a runway.

12. The system as defined in claim 1, wherein the instructions are configured to cause the one or more processors to cause monitoring of a deviation of a position of the aircraft from a desired flight path of the aircraft when the combined vision guidance operating mode is active.

13. The system as defined in claim 1, wherein the instructions are configured to cause the one or more processors to cause automatic activation of one or more aircraft system monitors upon activation of the combined vision guidance operating mode.

14. The system as defined in claim 1, wherein the instructions are configured to cause the one or more processors to cause annunciation of the activation of the synthetic guidance operating mode.

15. An aircraft comprising the system as defined in claim 1.

16. A method for operating a combined vision guidance operating mode of a vision guidance system of an aircraft, the method comprising:

causing simultaneous display of a first selectable object and of a second selectable object in a display area of a display device, the first selectable object being associated with an activation of the combined vision guidance operating mode and the second selectable object being associated with an activation of a synthetic vision guidance operating mode of the vision guidance system, the combined vision guidance operating mode including use of a combination of synthetic vision and enhanced vision, and the synthetic vision guidance operating mode including use of synthetic vision without enhanced vision;

receiving an input indicative of a selection of the first selectable object associated with the combined vision guidance operating mode, and after receiving the input, activating the combined vision guidance operating mode of the vision guidance system;

wherein the method also includes:

while the combined vision guidance operating mode is active, determining that an enhanced vision system of the aircraft is unavailable; then automatically deactivating the combined vision guidance operating mode; and automatically activating the synthetic vision guidance operating mode.

17. The method as defined in claim 16, wherein the display device is part of a multifunction controller.

18. The method as defined in claim 16, wherein the input is received in response to one or more actuations of a line select key.

19. The method as defined in claim 16, comprising, after receiving the input, arming the combined vision guidance operating mode before activating the combined vision guidance operating mode.

20. The method as defined in claim 16, wherein activating the combined vision guidance operating mode comprises automatically causing a head-up display device of a flight deck of the aircraft to display an image comprising the combination of synthetic vision and enhanced vision.

21. The method as defined in claim 16, wherein activating the combined vision guidance operating mode comprises automatically causing a head-down display device of a flight deck of the aircraft to display an image comprising the combination of synthetic vision and enhanced vision.

22. The method as defined in claim 16, wherein activating the combined vision guidance operating mode comprises automatically causing a head-down display device and a head-up display device of a flight deck of the aircraft to each display an image comprising the combination of synthetic vision and enhanced vision.

23. The method as defined in claim 22, comprising:
after receiving the input, automatically arming the combined vision guidance operating mode before activating the combined vision guidance operating mode;
annunciating the arming of the combined vision guidance operating mode on the head-up display device and on the head-down display device; and
upon the activation of the combined vision guidance operating mode, annunciating the activation of the combined vision guidance operating mode on the head-up display device and on the head-down display device.

24. The method as defined in claim 23, wherein:
annunciating the arming of the combined vision guidance operating mode comprises displaying an indication in a first color on the head-up display device and on the head-down display device; and
annunciating the activation of the combined vision guidance operating mode comprises displaying the indication in a second color different from the first color on the head-up display device and on the head-down display device.

25. The method as defined in claim 23, comprising activating the combined vision guidance operating mode after a threshold condition has been met.

26. The method as defined in claim 25, wherein the threshold condition comprises an altitude of the aircraft.

27. The method as defined in claim 25, wherein the threshold condition comprises a distance of the aircraft from a runway.

28. The method as defined in claim 16, comprising monitoring a deviation of a position of the aircraft from a desired flight path of the aircraft when the combined vision guidance operating mode is active.

29. The method as defined in claim 16, comprising automatically activating one or more aircraft system monitors upon activation of the combined vision guidance operating mode.

30. The method as defined in claim 16, comprising annunciating the activation of the synthetic guidance operating mode.

* * * * *